(12) United States Patent
Brossaud et al.

(10) Patent No.: US 8,927,470 B2
(45) Date of Patent: *Jan. 6, 2015

(54) PROCESS AND APPARATUS FOR PREPARING A SOAP CONCENTRATE, A LUBRICATING COMPOSITION, AND COMBINATIONS THEREOF

(75) Inventors: Jean-Luc Pierre André Brossaud, Petit Couronne (FR); David Edmund Code, Tomball, TX (US); Jerome Dabos, Petit Couronne (FR); Jean-Claude Emile Maximilien Holley, Bosc Roger en Roumois (FR); Aimin Huang, Sugar Land, TX (US); Krishna Rangraj Kaushik, Houston, TX (US); Catherine Maillard, Petit Couronne (FR); Raghunath Gopal Menon, Katy, TX (US); Jean-Paul Saint, Petit Couronne (FR); Rainer Hans Schade, Kuala Lumpur (ML)

(73) Assignee: Shell Oil Company, Houston, TX (US)

( * ) Notice: Subject to any disclaimer, the term of this patent is extended or adjusted under 35 U.S.C. 154(b) by 1737 days.

This patent is subject to a terminal disclaimer.

(21) Appl. No.: 12/302,342

(22) PCT Filed: May 29, 2007

(86) PCT No.: PCT/US2007/069875
§ 371 (c)(1),
(2), (4) Date: Dec. 23, 2009

(87) PCT Pub. No.: WO2007/143454
PCT Pub. Date: Dec. 13, 2007

(65) Prior Publication Data
US 2010/0197535 A1    Aug. 5, 2010

Related U.S. Application Data

(60) Provisional application No. 60/803,568, filed on May 31, 2006.

(51) Int. Cl.
*C10M 115/08*     (2006.01)
(Continued)

(52) U.S. Cl.
CPC ............. *C11D 13/00* (2013.01); *C10M 177/00* (2013.01); *B01J 2219/00006* (2013.01);
(Continued)

(58) Field of Classification Search
USPC .................. 508/154, 552; 252/367.1; 422/224
See application file for complete search history.

(56) References Cited

U.S. PATENT DOCUMENTS

| 1,781,167 A | 11/1930 | Doell et al. |
| 2,085,691 A | 6/1937 | Brown .............................. 87/16 |

(Continued)

FOREIGN PATENT DOCUMENTS

| EP | 0652096 | 11/1995 | |
| EP | 1674485 | 6/2006 | ............... C08F 8/12 |

(Continued)

OTHER PUBLICATIONS

International Search Report dated Jun. 6, 2008 (PCT/US2007/069875).
(Continued)

*Primary Examiner* — Vishal Vasisth

(57) ABSTRACT

The invention provides for a process and apparatus for preparing a soap concentrate, including: (a) introducing feed components to a first feeding zone; (b) first reacting in a first reacting zone; (c) first venting in a first venting zone; and (d) cooling in a cooling zone. The process may further include, after (c) and before (d): (i) continued reacting in a continued reacting zone; and (ii) second venting in a second venting zone. The invention also provides for a process and apparatus for preparing a lubricating composition comprising: (aa) introducing a soap concentrate and a base oil to a lubricating composition feeding zone; (bb) dispersing the soap concentrate in a lubricating composition dispersing zone; (cc) mixing the soap concentrate and the base oil in a lubricating composition mixing zone; and (dd) cooling in a lubricating composition cooling zone.

12 Claims, 4 Drawing Sheets

(51) Int. Cl.
*C07C 51/15* (2006.01)
*C11D 13/00* (2006.01)
*B01J 19/00* (2006.01)
*C10M 177/00* (2006.01)

(52) U.S. Cl.
CPC ............... *C10M 2207/1265* (2013.01); *C10M 2207/1285* (2013.01); *C10M 2207/26* (2013.01); *C10M 2207/262* (2013.01); *C10N 2210/01* (2013.01); *C10N 2210/02* (2013.01); *C10N 2230/06* (2013.01); *C10N 2230/08* (2013.01); *C10N 2230/12* (2013.01); *C10N 2230/52* (2013.01); *C10N 2250/10* (2013.01); *C10N 2260/14* (2013.01); *C10N 2270/02* (2013.01)
USPC ........ 508/518; 508/154; 508/552; 252/367.1; 422/224

(56) References Cited

U.S. PATENT DOCUMENTS

| | | | |
|---|---|---|---|
| 2,431,453 A | 11/1947 | Beerbower et al. | 252/35 |
| 2,946,751 A | 7/1960 | Beerbower et al. | 252/40 |
| 2,950,249 A | 8/1960 | Armstrong | 252/32 |
| 2,955,123 A | 10/1960 | Favis | 260/413 |
| 3,006,736 A | 10/1961 | Green | 23/253 |
| 3,226,432 A | 12/1965 | Clark et al. | 260/543 |
| 3,523,909 A | 8/1970 | Bradley et al. | 252/370 |
| 3,738,815 A | 6/1973 | Pawlowski et al. | 23/260 |
| 4,075,234 A | 2/1978 | Peterson | 260/417 |
| 4,392,967 A | 7/1983 | Alexander | 252/41 |
| 4,747,356 A | 5/1988 | Beisswenger et al. | 110/343 |
| 5,185,091 A | 2/1993 | Ogake et al. | |
| 5,310,492 A | 5/1994 | Seiki et al. | 252/68 |
| 5,917,089 A | 6/1999 | Howard | 562/519 |
| 6,039,774 A | 3/2000 | McMullen et al. | 48/102 A |
| 2005/0147706 A1 | 7/2005 | Browne et al. | 425/289 |
| 2006/0108706 A1 | 5/2006 | Galimberti et al. | 264/211.23 |
| 2006/0142499 A1 | 6/2006 | Guntherberg et al. | 525/242 |

FOREIGN PATENT DOCUMENTS

| | | | |
|---|---|---|---|
| GB | 470715 | 8/1937 | |
| GB | 579847 | 8/1946 | |
| JP | 57031999 | 2/1982 | |
| JP | 04314792 | 11/1992 | |
| JP | 2000038600 | 2/2000 | |
| JP | 2006028239 | 2/2006 | |
| WO | WO9745369 | 12/1997 | ............ C01C 3/02 |

OTHER PUBLICATIONS

Japanese Office Action dated Dec. 4, 2012, Japanese Patent Application No. 2009-513415 dated Nov. 30, 2012.

PROCESS AND APPARATUS FOR PREPARING A SOAP CONCENTRATE, A LUBRICATING COMPOSITION, AND COMBINATIONS THEREOF

The present application claims priority from U.S. Provisional Patent Application 60/803,568 filed 31 May 2006.

FIELD OF THE INVENTION

The invention relates to a process and an apparatus for preparing a soap concentrate, a lubricating composition, and combinations thereof.

BACKGROUND OF THE INVENTION

Soap concentrates, for example, lithium soap concentrates, lithium complex soap concentrates, and lithium-calcium complex soap concentrates, may be utilized with a base oil, generally to thicken a base oil, to provide for a lubricating composition commonly referred to as a grease.

In addition to the individual components which make up a lubricating composition, another contributing factor to the final properties and characteristics of the lubricating composition is the particular process and conditions under which the soap concentrate and the lubricating composition are manufactured. Process conditions, for example, the dispersing and mixing of the individual components and temperature variations may be significant factors affecting the soap concentrate and the resulting lubricating composition structure, for example, the nature of the soap crystallites and fibers formed.

U.S. Pat. No. 4,392,967 to A. Gordon Alexander discloses a process for continuously manufacturing a lubricating grease using a screw process unit comprising: (a) introducing feed materials and lubricating oil into selected locations of a screw process unit which contains a series of adjacent, longitudinally connected barrel sections for performing different operative steps and houses a rotating screw device traversing the interior of the barrel sections and having separate elements along its length to perform desired operations; (b) mixing and conveying said feed materials along said process unit through the adjacent barrel sections by continuous operation of said rotating screw; (c) controlling the temperature of said material while it is being conveyed through said process unit by use of various heat exchange means which are located in or adjacent each barrel to aid in carrying out the operative steps of dispersion, reaction, dehydration and/or homogenization; (d) venting water resulting from the dehydration of the feed mixture at selected barrel discharge points in said process unit; (e) introduction of additional lubricating oil and/or additives at downstream barrel locations following the dehydration step; (f) homogenization of said complete grease formulation by continued rotation of said screw device; and (g) removal of the finished lubricating grease from the end barrel section of said screw process unit.

Despite the history of soap concentrates and lubricating compositions and processes of preparing lubricating compositions, there is still a need for a continuous process of preparing a soap concentrate as well as a resulting lubricating composition that will provide advantages regarding the process, process stability, quality control, and economy. There is also still a need to provide for a process of preparing a soap concentrate that will provide for the flexibility to be applicable for many types of lubricating compositions without significant changes in the equipment being used.

There is also still a need for a process that provides for flexibility to provide for a soap concentrate at one location that may be utilized to provide for a lubricating composition at the same location or at a different location.

There is also still a need for a process for preparing a soap concentrate, a lubricating composition, and combinations thereof that requires a low amount of water addition to minimize the energy needed to flash resulting steam.

SUMMARY OF THE INVENTION

The invention provides for a process for preparing a soap concentrate comprising: (a) introducing feed components to a first feeding zone; (b) first reacting in a first reacting zone; (c) first venting in a first venting zone; and (d) cooling in a cooling zone. A process for preparing a soap concentrate may further comprise, after (c) and before (d): (i) continued reacting in a continued reacting zone; and (ii) second venting in a second venting zone.

The invention also provides for an apparatus for preparing a soap concentrate comprising: (a) a first feeding zone; (b) a first reacting zone; (c) a first venting zone, and (d) a cooling zone. An apparatus for preparing a soap concentrate may further comprise, after (c) and before (d): (i) a continued reacting zone; and (ii) a second venting zone.

The invention also provides for a process for preparing a lubricating composition comprising: (aa) introducing a soap concentrate and a base oil to a lubricating composition feeding zone; (bb) dispersing the soap concentrate in a lubricating composition dispersing zone; (cc) mixing the soap concentrate and the base oil in a lubricating composition mixing zone; and (dd) cooling in a lubricating composition cooling zone. A process for preparing a lubricating composition may further comprise subjecting a lubricating composition to lubricating composition processing.

The invention also provides for an apparatus for preparing a lubricating composition comprising: (aa) a lubricating composition feeding zone; (bb) a lubricating composition dispersing zone; (cc) a lubricating composition mixing zone; and (dd) a lubricating composition cooling zone. An apparatus for preparing a lubricating composition may further comprise lubricating composition processing apparatus.

BRIEF DESCRIPTION OF THE DRAWINGS

One or more embodiments of the invention are described in detail and by way of example only with reference to the accompanying drawings.

DETAILED DESCRIPTION OF THE INVENTION

Figure 1:
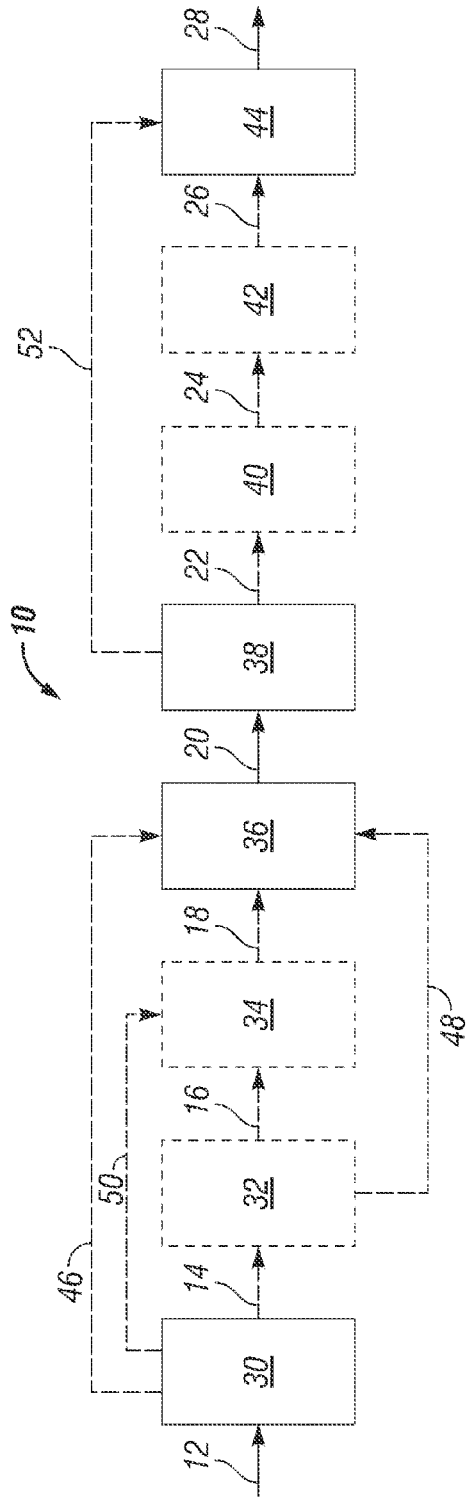
FIG. 1 schematically depicts a process for preparing a soap concentrate according to a process of the invention.

The invention provides for a process for the preparation of a composition selected from the group consisting of soap concentrates, base greases, finished greases, precursors thereof, intermediates thereof, and combinations thereof. The invention preferably provides for the continuous preparation of a composition selected from the group consisting of soap concentrates, base greases, finished greases, precursors thereof, intermediates thereof, and combinations thereof. For example, by continuously making a soap concentrate, flexibility is obtained in making a variety of resulting lubricating compositions. As used herein, the terms "continuous" and "continuously" refer to a process of the invention being conducted generally uninterrupted in time and sequence compared to conventional techniques, for example, batch processing. As used herein, the term "lubricating composition" refers to a grease, for example, a base grease or a finished grease.

The invention provides for one or more of the following advantages.

An advantage of the invention is the flexibility that is provided to adapt a process and apparatus of the invention to provide for a composition selected from the group consisting of soap concentrates, base greases, finished greases, precursors thereof, intermediates thereof, and combinations thereof without the need for major changes in equipment or flow path.

Another advantage of the invention is that a reduced amount of base oil feed is added with the feed components to provide for a soap concentrate. Preferably, only an amount of base oil feed necessary to begin the flow of feed components is utilized. More preferably, no base oil feed is added with the feed components to provide for a soap concentrate that is more dry than a soap concentrate that is prepared from a process that utilizes the addition of base oil feed with the feed components.

Another advantage of the invention is that a reduced amount of water may be added to a process of the invention compared to conventional techniques. A reduced amount of water added to a process of the invention may provide for less energy being required to vent or flash any resulting steam and there may be less residual moisture.

Another advantage of the invention is that a soap concentrate may be provided that is of a suitable composition that the soap concentrate may be added to other components to provide for a base grease using the same apparatus of the invention that was utilized to provide the soap concentrate. Additional components may also be added to provide for a finished grease.

Another advantage of the invention is that a soap concentrate may be provided that is of a suitable composition and purity that may then be utilized to provide for a base grease, a finished grease, or a combination thereof using conventional reconstitution techniques or an apparatus of the invention that is not the same apparatus utilized to provide for the soap concentrate. For example, a soap concentrate may be provided using an apparatus and process of the invention at a particular location. The soap concentrate may then be relocated to another location for preparing a base grease, a finished grease, or a combination thereof using conventional reconstitution techniques or an apparatus and process of the invention.

Base oils, also referred to in the art as lubricating oils, suitable for use in a process and apparatus of the invention may typically be the same as base oils that would normally be selected for oil lubrication, or, for example, for preparing a lubricating composition from batch processing. The base oil may be of mineral origin, synthetic origin, or combinations thereof. Base oils of mineral origin may be mineral oils, for example, those produced by solvent refining or hydroprocessing. Base oils of synthetic origin may typically comprise mixtures of $C_{10}$-$C_{50}$ hydrocarbon polymers, for example liquid polymers of alpha-olefins, ester type synthetic oils, ether type synthetic oils, and combinations thereof.

Suitable examples of synthetic oils include polyolefins, for example, alpha-olefin oligomer and polybutene, polyalkylene glycols, for example, polyethylene glycol and polypropylene glycol, diesters, for example, di-2-ethyl hexyl sebacate and di-2-ethyl hexyl adipate, polyol esters, for example, trimethylolpropane ester and pentaerythritol ester, perfluoroalalkyl ethers, silicone oils, polyphenyl ethers, either individually or as mixed oils.

Suitable examples of base oils include medium viscosity mineral oils, high viscosity mineral oils, and combinations thereof. Medium viscosity mineral oils comprise oils having a viscosity generally in a range of from 5 $mm^2/s$ centistokes (cSt) at 100° C. to 15 $mm^2/s$ (cSt) at 100° C., preferably in a range of from 6 $mm^2/s$ (cSt) at 100° C. to 12 $mm^2/s$ (cSt) at 100° C., and more preferably in a range of from 7 $mm^2/s$ (cSt) at 100° C. to 12 $mm^2/s$ (cSt) at 100° C. High viscosity mineral oils comprise oils having a viscosity generally in a range of from 15 $mm^2/s$ (cSt) at 100° C. to 40 $mm^2/s$ (cSt) at 100° C. and preferably in a range of from 15 $mm^2/s$ (cSt) at 100° C. to 30 $mm^2/s$ (cSt) at 100° C.

Suitable examples of mineral oils that may conveniently be used include those sold by member companies of the Shell Group under the designations "HVI", "MVIN", or "HMVIP". Polyalphaolefins and base oils of the type prepared by the hydroisomerisation of wax, for example those sold by member companies of the Shell Group under the designation "XHVI" (trade mark), may also be used.

Soap concentrates prepared according to the invention that may be used in a lubricating composition include, for example, simple soap concentrates and complex soap concentrates. Simple soap concentrates include, for example, fatty acid soaps of lithium, calcium, sodium, aluminum, and barium. Complex soap concentrates include, for example, simple soap concentrates additionally comprising a complexing agent.

Examples of preferred suitable soap concentrates include lithium soap concentrates, lithium complex soap concentrates, lithium-calcium soap concentrates, and calcium complex soap concentrates. Examples of more preferred soap concentrates include lithium soap concentrates and lithium complex soap concentrates.

Lithium soap concentrates, also referred to in the art as simple lithium soap concentrates, are derived from $C_{10-24}$, preferably $C_{15-18}$, saturated or unsaturated fatty acids or derivatives thereof. One preferred fatty acid derivative is hydrogenated castor oil (referred to herein as HCO), which is the glyceride of 12-hydroxystearic acid. 12-hydroxystearic acid is a particularly preferred fatty acid. Hydrogenated castor oil fatty acid (referred to herein as HCOFA) generally comprises at least 85 weight percent of 12-hydroxystearic acid based on the total weight of HCOFA. HCOFA may comprise minor amounts of additional components. Examples of additional components include palmitic acid (C16), stearic acid (C18), arachidic acid (C20), 12-ketostearic acid, and combinations thereof. As used herein, the term "hydrogenated castor oil fatty acid" ("HCOFA") refers to a composition comprising an amount of 12-hydroxystearic acid that may provide for a process of the invention, generally an amount comprising at least 85 weight percent 12-hydroxystearic acid based on the total weight of HCOFA, preferably an amount comprising in a range of from 85 to 87 weight percent 12-hydroxystearic acid based on the total weight of HCOFA.

Lithium complex soap concentrates are lithium soap concentrates comprising a complexing agent. Examples of suitable complexing agents include low to medium molecular weight acids, dibasic acids, salts thereof, for example benzoic acid, boric acid, lithium borate, and combinations thereof, preferably boric acid.

A lubricating composition prepared according to a process of the invention may comprise one or more additional additives, in amounts normally used in this field of application, to impart certain desirable characteristics to the lubricating composition including, for example, oxidation stability, tackiness, extreme pressure properties, corrosion inhibition, reduced friction and wear, and combinations thereof.

Examples of suitable additional additives include antioxidants, anti-rust additives, anti-wear and extreme pressure additives, pour point depressants, metal deactivators, and combinations thereof.

Examples of suitable additional additives include extreme pressure/antiwear agents, for example, zinc salts, for example, zinc dialkyl or diaryl dithiophosphates, borates, molybdenum dithiophosphate, substituted thiadiazoles, polymeric nitrogen/phosphorus compounds made, for example, by reacting a dialkoxy amine with a substituted organic phosphate, amine phosphates, sulphurised sperm oils of natural or synthetic origin, sulphurised lard, sulphurised esters, sulphurised fatty acid esters, sulphurised materials, organophosphates, for example according to the formula $(OR)_3P=O$ where R is an alkyl, aryl or aralkyl group, and triphenyl phosphorothionate; one or more overbased metal-containing detergents, for example, calcium or magnesium alkyl salicylates, alkylarylsulphonates or alkylsulphonates; ashless dispersant additives, for example, reaction products of polyisobutenyl succinic anhydride and an amine or ester; antioxidants, for example, hindered phenols or amines, for example phenyl alpha naphthylamine; antirust additives, for example, zinc naphthenate; friction-modifying additives; viscosity-index improving agents; pour point depressing additives; tackiness agents, and combinations thereof. Solid materials, for example, graphite, finely divided molybdenum disulphide, talc, metal powders, and various polymers, for example, polyethylene wax may also be added to impart special properties. An example aryl group is a phenyl group. An example aralkyl is a benzyl group.

A lubricating composition prepared according to a process of the invention may comprise an additional additive comprising a single zinc dithiophosphate or a combination of two or more zinc dithiophosphates. Examples of suitable zinc dithiophosphates include zinc dialkyl dithiophosphates, zinc diaryl dithiophosphates, zinc alkylaryl dithiophosphates, and combinations thereof. A preferred zinc dithiophosphate is a zinc dialkyl dithiophosphate. The alkyl moieties of a zinc dialkyl dithiophosphate may be straight chain or branched chain and generally comprise from 1 carbon atom to 20 carbon atoms, preferably from 8 carbon atoms to 20 carbon atoms, and more preferably from 8 carbon atoms to 12 carbon atoms.

A lubricating composition prepared according to a process of the invention may comprise an additional additive comprising a single ashless dithiocarbamate or a combination of two or more ashless dithiocarbamates. Examples of suitable ashless dithiocarbamates include ashless dialkyl dithiocarbamates, diaryl dithiocarbamates, alkylaryl dithiocarbamates, and combinations thereof. A preferred ashless dithiocarbamate is an ashless dialkyldithiocarbamate, more preferably a methylene-bis-dialkyldithiocarbamate. The alkyl moieties of an ashless dialkyl dithiocarbamate may be straight or branched chain and preferably contain from 1 carbon atom to 12 carbon atoms, more preferably from 2 carbon atoms to 6 carbon atoms. An example of a preferred ashless dithiocarbamate is methylene-bis-dibutyl-dithiocarbamate.

A lubricating composition prepared according to a process of the invention may comprise from 0.1 weight percent to 10 weight percent, preferably from 0.1 weight percent to 5 weight percent, more preferably from 0.1 weight percent to 2 weight percent, and even more preferably from 0.2 weight percent to 1 weight percent of one or more additional additives as referred to herein based on the total weight of the lubricating composition. For example, a combination of additional additives may be needed to achieve a higher weight percent of additional additive, for example 10 weight percent.

Soap concentrates may be made from feed components including, for example, saponifiable components, saponification agents, optionally complexing agents, and combinations thereof. The feed components may be provided to a first feeding zone of the invention.

Examples of suitable saponifiable components include fatty esters, preferably glycerides, preferably where the fatty group contains a hydroxy radical, for example, castor oil or hydrogenated castor oil.

Examples of suitable saponification agents include alkali metals, alkaline earth metal hydroxides, and combinations thereof, preferably lithium hydroxide or hydrates thereof.

An example process of soap concentrate formation comprises neutralizing fatty acids or hydroxy fatty acids in mineral oil with alkali metals, alkaline earth metal hydroxides, hydrates thereof, and combinations thereof, preferably lithium hydroxide monohydrate ($LiOH.H_2O$). Alternatively, hydrogenated fatty acids or hydrogenated hydroxy fatty acids may be used in the neutralization. Examples of feed components, to be introduced to a first feeding zone of the invention, include: (a) hydrogenated castor oil (HCO) and lithium hydroxide, lithium hydroxide monohydrate, or a combination thereof; (b) hydrogenated castor oil and lithium hydroxide, lithium hydroxide monohydrate, calcium hydroxide, or a combination thereof; (c) 12-hydroxystearic acid (for example, may be provided as a component of hydrogenated castor oil fatty acid (HCOFA)) and lithium hydroxide, lithium hydroxide monohydrate, or a combination thereof; and (d) 12-hydroxystearic acid (for example, may be provided as a component of hydrogenated castor oil fatty acid (HCOFA)) and lithium hydroxide, lithium hydroxide monohydrate, calcium hydroxide, or a combination thereof.

Examples of preferred feed components, to be introduced to a first feeding zone of the invention include: (i) 12-hydroxystearic acid (for example, may be provided as a component of HCOFA) and lithium hydroxide monohydrate and (ii) hydrogenated castor oil (HCO) and lithium hydroxide monohydrate.

In general, when 12-hydroxystearic acid is utilized, for example, feed components (c) and (d), the feed components may further comprise a complexing agent. Examples of suitable complexing agents that may be added as a feed component include short chain fatty acids, dicarboxylic acids, hydroxy aromatic acids, boric acid, aluminum compounds, and combinations thereof. An example of a suitable short chain fatty acid is acetic acid. An example of a suitable dicarboxylic acid is azelaic acid. An example of a suitable hydroxy aromatic acid is salicylic acid. If such complexing agents are used, the proportion of saponification agents is usually increased with the stoichiometric quantity of the complexing agent. A preferred complexing agent is boric acid.

When preparing a lithium-calcium soap concentrate according to a process of the invention, an additional component, for example, glycerol, may be added.

The ratio of water to solid(s), for example, lithium hydroxide, lithium hydroxide monohydrate, calcium hydroxide, or a combination thereof may be any ratio that suitably provides for a composition, for example, a soap concentrate, prepared according to a process of the invention. The ratio of water to solid is generally in a range of from 0:1 to 1:1, preferably in a range of from 0:1 to 0.75:1, and more preferably in a range of from 0:1 to 0.5:1. An advantage of the invention is that a soap concentrate may be provided without the addition of water. In other words, the ratio of water to solid may be 0:1. A reduced amount of water may provide for less energy being required to vent or flash resulting steam compared to a process that utilizes a higher amount of water addition.

A lithium soap concentrate generally comprises hydrogenated castor oil (HCO) and a lithium hydroxide component, for example lithium hydroxide monohydrate, in any amount that suitably provides for a lithium soap concentrate prepared according to a process of the invention. A lithium soap concentrate prepared according to a process of the invention comprises an amount of HCO based on the total weight of the lithium soap concentrate generally in a range of from 75 weight percent to 95 weight percent, preferably in a range of from 80 weight percent to 95 weight percent, and more preferably in a range of from 82 weight percent to 92 weight percent.

A lithium soap concentrate prepared according to a process of the invention comprises an amount of a lithium hydroxide component, for example lithium hydroxide monohydrate, based on the total weight of the lithium soap concentrate generally in a range of from 8 weight percent to 20 weight percent, preferably in a range of from 10 weight percent to 15 weight percent, and more preferably in a range of from 12 weight percent to 14 weight percent.

A lithium complex soap concentrate generally comprises hydrogenated castor oil fatty acid (HCOFA), a lithium hydroxide component, for example lithium hydroxide monohydrate, a complexing agent, for example boric acid, and may comprise one or more initial additives, in any amount that suitably provides for a lithium complex soap concentrate prepared according to a process of the invention. Initial additives may comprise a first initial additive and a second initial additive. Initial additives may comprise one or more dispersing agents, for example metal detergents. Examples of initial additives include calcium salicylate, calcium carbonate tall-oil fatty acids complex, calcium sulphonate, barium sulphonate, magnesium alkyl salicylate, and combinations thereof.

A lithium complex soap concentrate prepared according to a process of the invention comprises an amount of HCOFA based on the total weight of the lithium complex soap concentrate generally in a range of from 50 weight percent to 65 weight percent, preferably in a range of from 50 weight percent to 60 weight percent, and more preferably in a range of from 54 weight percent to 60 weight percent.

A lithium complex soap concentrate prepared according to a process of the invention comprises an amount of a lithium hydroxide component, for example lithium hydroxide monohydrate, based on the total weight of the lithium complex soap concentrate generally in a range of from 10 weight percent to 20 weight percent, preferably in a range of from 10 weight percent to 16 weight percent, and more preferably in a range of from 12 weight percent to 16 weight percent.

A lithium complex soap concentrate prepared according to a process of the invention comprises an amount of complexing agent based on the total weight of the lithium complex soap concentrate generally in a range of from 6 weight percent to 12 weight percent, preferably in a range of from 6 weight percent to 10 weight percent, and more preferably in a range of from 8 weight percent to 10 weight percent.

A lithium complex soap concentrate prepared according to a process of the invention may comprise one or more initial additives, for example, one or more dispersing agents or metal detergents, based on the total weight of the lithium complex soap concentrate generally in a range of from 10 weight percent to 30 weight percent, preferably in a range of from 16 weight percent to 24 weight percent, and more preferably in a range of from 18 weight percent to 22 weight percent. For example, a combination of initial additives may be needed to achieve a higher weight percent of initial additive, for example 30 weight percent.

For example, a lithium complex soap concentrate prepared according to a process of the invention may comprise an amount of first initial additive, for example, a first metal detergent, based on the total weight of the lithium complex soap concentrate generally in a range of from 5 weight percent to 15 weight percent, preferably in a range of from 8 weight percent to 12 weight percent, and more preferably in a range of from 9 weight percent to 11 weight percent.

Also for example, a lithium complex soap concentrate prepared according to a process of the invention may comprise an amount of second initial additive, for example, a second metal detergent, based on the total weight of the lithium complex soap concentrate generally in a range of from 5 weight percent to 15 weight percent, preferably in a range of from 8 weight percent to 12 weight percent, and more preferably in a range of from 9 weight percent to 11 weight percent.

A lubricating composition prepared according to a process of the invention generally comprises a base oil and a soap concentrate as referred to herein. A lubricating composition prepared according to a process of the invention comprises a weight percent of soap concentrate based on the total weight of the lubricating composition generally in a range of from 2 weight percent to 25 weight percent, preferably in a range of from 3 weight percent to 20 weight percent, and more preferably in a range of from 5 weight percent to 20 weight percent.

A lubricating composition prepared according to a process of the invention comprises a weight percent of base oil based on the total weight of the lubricating composition generally in a range of from 70 weight percent to 98 weight percent, preferably in a range of from 75 weight percent to 95 weight percent, and more preferably in a range of from 75 weight percent to 90 weight percent.

The invention generally comprises one or more zones. When preparing a soap concentrate, for example, a lithium soap concentrate, the zones may include, for example, a first feeding zone, a first reacting zone, a first venting zone, and a cooling zone, and may further include, after the first venting zone and before the cooling zone, a continued reacting zone and a second venting zone. When preparing a soap concentrate, for example, a lithium soap concentrate, the zones may include, for example, a first feeding zone, a water injecting zone, a first reacting zone, a first venting zone, and a cooling zone, and may further include, after the first venting zone and before the cooling zone, a continued reacting zone and a second venting zone.

When preparing a soap concentrate, for example, a lithium complex concentrate, the zones may include, for example, a first feeding zone, a second feeding zone, a first reacting zone, a first venting zone, and a cooling zone, and may further include, after the first venting zone and before the cooling zone, a continued reacting zone and a second venting zone. When preparing a soap concentrate, for example, a lithium complex soap concentrate, the zones may include, for example, a first feeding zone, a water injecting zone, a second feeding zone, a first reacting zone, a first venting zone, and a cooling zone, and may further include, after the first venting zone and before the cooling zone, a continued reacting zone and a second venting zone.

Generally, when preparing a soap concentrate, the zones, also referred to herein as soap concentrate zones, are in the order as disclosed herein and may comprise combinations of the zones described herein. The soap concentrate zones may also be used to provide for a base grease as described herein. The soap concentrate zones may comprise additional zones. Examples of suitable additional zones include one or more additional feeding zones, water injecting zones, reacting zones, venting zones, cooling zones, and combinations thereof.

Generally, the zones for preparing a lubricating composition, for example, a base grease or a finished greases, also referred to herein as lubricating composition zones, include (aa) a lubricating composition feeding zone; (bb) a lubricating composition dispersing zone; (cc) a lubricating composition mixing zone; and (dd) a lubricating composition cooling zone. An apparatus for preparing a lubricating composition may further comprise lubricating composition processing apparatus. Examples of suitable lubricating composition processing apparatus include static mixers, homogenizers, screen packs, and combinations thereof.

For example, the lubricating composition zones may provide for a base grease. The base grease may then be provided to lubricating composition processing apparatus including, for example, static mixers, homogenizers, screen packs, and combinations thereof, to provide for a finished grease. When the lubricating composition zones comprise a screw element, for example, an extruder, utilizing the lubricating composition processing apparatus may provide for the ability to use an extruder that is shorter than when an extruder is utilized to provide for a finished grease. Use of a short extruder followed by lubricating composition processing apparatus to provide for a finished grease may be more economical than use of a longer extruder without lubricating composition processing apparatus to provide for a finished grease.

Generally, the lubricating composition zones are in the order as disclosed herein and may comprise combinations of the lubricating composition zones described herein. The lubricating composition zones may comprise additional zones. Examples of suitable additional zones include additional lubricating composition feeding zones, dispersing zones, mixing zones, cooling zones, and combinations thereof.

Also for example, the lubricating composition zones may be separate from the soap concentrate zones and comprise a separate apparatus of the invention. Also for example, the lubricating composition zones may be separate from the soap concentrate zones and comprise conventional reconstitution techniques. For example, the lubricating composition zones may comprise one or more kettles.

A process for preparing a lubricating composition may comprise: (aa) introducing a soap concentrate and a base oil to a lubricating composition feeding zone; (bb) dispersing the soap concentrate in a lubricating composition dispersing zone; (cc) mixing the soap concentrate and the base oil in a lubricating composition mixing zone; and (dd) cooling in a lubricating composition cooling zone.

For example, a soap concentrate of the invention and a base oil may be added to the lubricating composition feeding zone that may then be passed from the lubricating composition feeding zone to the lubricating composition dispersing zone. The resulting composition may then be passed from the lubricating composition dispersing zone to the lubricating composition mixing zone. The resulting composition may then be passed from the lubricating composition mixing zone to the lubricating composition cooling zone to provide for a base grease.

Also for example, a process for preparing a lubricating composition may further comprise subjecting the base grease to additional processing comprising subjecting the base grease to lubricating composition processing. Examples of suitable lubricating composition processing include static mixing, homogenizing, screening, and combinations thereof.

The additional processing of a lubricating composition, for example, a base grease, as described herein utilizing lubricating composition processing apparatus as described herein may comprise any static mixer(s), homogenizer(s), screen pack(s), and combinations thereof utilized in the preparing of a lubricating composition, for example, a finished grease. Screen packs may be used to homogenize. Example screen packs may use single screen or multiple screens comprising various mesh sizes. Homogenization may be achieved by forcing, for example, squeezing, the finished grease through the screen pack.

Also for example, one or more additional additives may be added to the cooling zone or lubricating composition cooling zone, or after the cooling zone or the lubricating composition cooling zone, in other words, outside the cooling zones using, for example, a static mixer, to provide for a finished grease.

The invention may provide for flexibility in preparing various compositions including, for example, soap concentrates, base greases, finished greases, and combinations thereof. For example, an apparatus and process of the invention may be utilized to provide for a soap concentrate. The soap concentrate may then be utilized, using conventional reconstitution techniques, for example batch processing utilizing, for example, open kettles, pressurized kettles, and combinations thereof, to provide for a base grease. The base grease may then be utilized using conventional additivation techniques to provide for a finished grease. Also for example, an apparatus and process of the invention may be utilized to provide for a base grease. Also for example, an apparatus and process of the invention utilized to provide for a soap concentrate may be modified to provide for the lubricating composition zones as described herein to provide for a base grease. The base grease may then be utilized using conventional additivation techniques to provide for a finished grease. Also for example, an apparatus and process of the invention may be utilized to provide for a finished grease using the same apparatus and process of the invention.

Also for example, an apparatus and a process of the invention may be utilized to provide for a soap concentrate. The soap concentrate may then be utilized to provide for a base grease using, for example, a separate apparatus and process of the invention, conventional reconstitution techniques, or a combination thereof that may be located at the same location as the apparatus used to provide for the soap concentrate or at a different location.

Also for example, an apparatus and a process of the invention may be utilized to provide for a base grease. The base grease may then be utilized to provide for a finished grease using conventional additivation techniques, for example, static mixers, that may be located at the same location as the apparatus used to provide for the base grease or at a different location.

For example, a process of the invention may comprise obtaining a soap concentrate from the cooling zone and reconstituting a base grease utilizing, for example, a process for preparing the soap concentrate, a process for preparing a lubricating composition, conventional reconstitution techniques, or a combination thereof. Also for example, a process of the invention may comprise obtaining a soap concentrate from the cooling zone and preparing, for example, reconstituting, a base grease utilizing said process for preparing the soap concentrate comprising introducing the soap concentrate and a base oil as feed components to the first feeding zone.

Utilizing an apparatus(es) and process(es) of the invention at different locations provides for the flexibility to provide for a soap concentrate at one location and then send the soap concentrate to another location to provide for a base grease, a finished grease, or a combination thereof depending on the needs of the sent-to location.

Utilizing an apparatus(es) and process(es) of the invention at different locations also provides for the flexibility to provide for a base grease at one location and then send the base grease to another location to provide for a finished grease depending on the needs of the sent-to location.

The pressure in the various zones may be any suitable pressure that provides for a process of the invention. The pressure in the various zones may generally be the result of the throughput, screw element, or a combination thereof.

The feeding zones, for example, the first feeding zone, second feeding zone, lubricating composition feeding zone, and combinations thereof suitably provide for the introduction of components. It may not be necessary to have or utilize all of the feeding zones. For example, when preparing a lithium complex soap concentrate, hydrogenated castor oil fatty acid (HCOFA), lithium hydroxide monohydrate (LiOH.$H_2$O), and boric acid may be introduced to the first feeding zone and initial additives including, for example, a first metal detergent, a second metal detergent, and combinations thereof may be introduced to the second feeding zone.

Also for example, when preparing a lithium soap concentrate, hydrogenated castor oil (HCO) and LiOH,$H_2$O may be introduced to the first feeding zone and a second feeding zone may not be present or may be present and not utilized.

Also for example, when preparing a base grease, base grease components may be introduced to the lubricating composition feeding zone. Examples of suitable base grease components include a soap concentrate, for example, a soap concentrate prepared according to a process of the invention, base oils, and combinations thereof.

Introducing components to the feeding zones may be provided by any means that suitably provides for a process of the invention. Examples of suitable means for introducing components to the feeding zones include gravimetric feeders, volumetric feeders, pumps (for example, when utilizing liquid feed components), and combinations thereof. Examples of suitable commercial gravimetric feeders include K-Tron gravimetric feeders from K-Tron International, Inc., Pitman, N.J., USA, and Brabender gravimetric feeders from Brabender Technologie KG, Duisburg, Germany. The feed components may be introduced to a feed hopper that may be fitted with a feed auger.

The temperature of the feeding zones, for example, the first feeding zone, second feeding zone, and lubricating composition feeding zone may be any suitable temperature that provides for the feeding of components. The temperature of the feeding zones is generally in a range of from 20° C. to 80° C., preferably in a range of from 30° C. to 70° C., and more preferably in a range of from 40° C. to 60° C.

The first feeding zone and the second feeding zone provide for a feeding of components. The first and second feeding zones may comprise, for example, a screw element or a combination of screw elements. The section of the screw element in the first and second feeding zones may include, for example, small pitch conveying elements, large pitch conveying elements, under-cut conveying elements, spacers, and combinations thereof. The conveying elements, spacers, and combinations thereof in the first feeding zone and second feeding zone may depend on factors including, for example, the size of the apparatus, the diameter of the screw element, and combinations thereof. Examples of elements in the first and second feeding zones include 28/14, 28/28, 42/21, 42/42, 25/25, 40/40, 40/60, 60/30, and 60/60. Examples of under-cut conveying elements in the first and second feeding zones include 42/21SK and 42/42SK. When under-cut conveying elements are utilized, transition elements, for example, 42/21SKN, may be utilized to smoothly transition the root of the under-cut element to the standard self-wiped element profiles. The first number of the element indicates the pitch and the second number of the element indicates the length. For example, conveying element 28/14 indicates an element having a pitch of 28 millimeters (mm) and a length of 14 mm.

When a water injecting zone is utilized, the water injecting zone suitably provides for the injecting of water and may also provide for a transporting of a composition during a process of the invention. Injecting of water may be provided using any means that suitably provides for a process of the invention. Examples of suitable means for injecting water include tubes, spray nozzles, two-phase nozzles (where, for example, air and nitrogen may be utilized to atomize the water), and combinations thereof.

The temperature of the water injecting zone may be any suitable temperature that provides for the injecting of water. The temperature of the water injecting zone is generally in a range of from 60° C. to 95° C., preferably in a range of from 50° C. to 90° C., and more preferably in a range of from 60° C. to 80° C.

The water injecting zone may comprise, for example, a screw element or a combination of screw elements. The section of the screw element in the water injecting zone may include, for example, small pitch conveying elements, large pitch conveying elements, under-cut conveying elements, mixing elements, spacers, and combinations thereof. The conveying elements, mixing elements, spacers, and combinations thereof in the water injecting zone may depend on factors including, for example, the size of the apparatus, the diameter of the screw element, and combinations thereof. Examples of elements in the water injecting zone include 28/14, 28/28, 42/21, 42/42, 25/25, 40/40, 40/60, 60/30, and 60/60.

While a water injecting zone may be utilized, an advantage of the invention is that the addition of water is an option of the invention. Not adding water may provide for a process that provides for a reduced amount of energy needed to vent or flash any residual steam compared to a process that utilizes an increased amount of water.

The first reacting zone suitably provides for a first reacting of components. Reacting in the first reacting zone (referred to herein as first reacting) provides for a reacting of feed components to provide for a first-reacted composition. Reacting in the first reacting zone may be provided using any means that suitably provides for a process of the invention. Examples of suitable means for reacting in the first reacting zone include a screw element and a combination of screw elements.

The temperature of the first reacting zone may be any suitable temperature that provides for a reacting of components. The temperature of the first reacting zone is generally in a range of from 60° C. to 240° C., preferably in a range of from 70° C. to 230° C., and more preferably in a range of from 80° C. to 220° C.

When a continued reacting zone is utilized, the continued reacting zone suitably provides for a continued reacting of components. Reacting in the continued reacting zone (referred to as continued reacting) provides for a continued reacting of feed components to provide for a composition. Reacting in the continued reacting zone may be provided using any means that suitably provides for a process of the invention. Examples of suitable means for reacting in the continued reacting zone include a screw element and a combination of screw elements.

The temperature of the continued reacting zone may be any suitable temperature that provides for a reacting of components. The temperature of the continued reacting zone is generally in a range of from 180° C. to 250° C., preferably in a range of from 190° C. to 240° C., and more preferably in a range of from 200° C. to 230° C.

The section of the screw element in the first reacting zone and continued reacting zone may include, for example, small pitch conveying elements, large pitch conveying elements, normal kneading elements, reverse kneading elements, mixing elements, spacers, and combinations thereof. The elements, spacers, and combinations thereof in the first reacting zone and continued reacting zone may depend on factors including, for example, the size of the apparatus, the diameter of the screw element, and combinations thereof. Examples of conveying elements in the first reacting zone and continued reacting zone include 28/14, 28/28, 42/21, 42/42, 25/25, 40/40, 40/60, 60/30, and 60/60. Examples of kneading elements in the first reacting zone and continued reacting zone include KB 45/5/14, KB 45/5/14 Li, KB 45/5/20, KB 45/5/28, KB 45/5/20 Li, and KB 45/5/40. Examples of mixing elements in the first reacting zone and continued reacting zone include ZME 6.5/13, TME/60, and SME 42/42. When an element is described with three numbers, the first number indicates the staggering angle (degrees), the second number indicates the number of disks, and the third number indicates the length. KB indicates kneading blocks, ZME indicates teeth mixing element, TME indicates turbine mixing element, and SME indicates screw mixing element.

The first reacting zone, first venting zone, and continued reacting zone may be combined as one general reacting zone that provides for a reacting and mixing of the feed components.

Venting in the first venting zone (referred to herein as first venting) and, when utilized, venting in the second venting zone (referred to herein as second venting), may provide for a venting of steam to provide for a vented composition. A vented composition generally comprises a low moisture content. Venting in the first venting zone and second venting zone may be provided using any means that suitably provides for a process of the invention. Examples of suitable means for first venting in the first venting zone and means for second venting in the second venting zone include atmospheric vents, light vacuum vents, and combinations thereof. A preferred means for venting in the first venting zone and second venting zone comprise the use of light vacuum vents.

The temperature of the first venting zone and second venting zone may be any suitable temperature that provides for venting. The temperature of the first venting zone and second venting zone is generally in a range of from 160° C. to 220° C., preferably in a range of from 170° C. to 210° C., and more preferably in a range of from 180° C. to 200° C.

The first venting zone and the second venting zone may comprise, for example, a screw element or a combination of screw elements. The section of the screw element in the first venting zone and second venting zone may include, for example, small pitch conveying elements or large pitch conveying elements and may also include spacers. The elements, spacers, and combinations thereof in the first venting zone and second venting zone may depend on factors including, for example, the size of the apparatus, the diameter of the screw element, and combinations thereof. Examples of conveying elements in the first venting zone and second venting zone include 28/14, 28/28, 42/21, 42/42, 25/25, 40/40, 40/60, 60/30, and 60/60.

The cooling zones, for example, the cooling zone and lubricating composition cooling zone, suitably provide for a cooling of a composition. Cooling in the cooling zone (referred to herein as first cooling) may provide for a cooled composition and may further provide for a transporting of the cooled composition to a location in the process where a composition, for example, a soap concentrate, may be obtained.

Cooling in the lubricating composition cooling zone (referred to herein as lubricating composition cooling) may provide for a cooled lubricating composition and may further provide for a transporting of the cooled lubricating composition to a location in the process where a lubricating composition of the invention may be obtained. Cooling in the lubricating composition cooling zone may help provide for fiber formation. One or more additional additives may be added to the lubricating composition cooling zone or after the lubricating composition cooling zone, in other words, outside the lubricating composition cooling zone using, for example, a static mixer, to provide for a finished grease.

When cooling in the cooling zones further provides for transporting, the transporting may be provided using any means that suitably provides for a process of the invention. Examples of suitable means for transporting in the cooling zone include a screw element and a combination of screw elements. Examples of suitable means for transporting in the lubricating composition cooling zone include a screw element and a combination of screw elements.

The temperature of the cooling zones may be any suitable temperature that provides for a cooling as referred to herein. The temperature of the cooling zones is generally in a range of from 30° C. to 190° C., preferably in a range of from 40° C. to 180° C., and more preferably in a range of from 50° C. to 170° C.

The section of the screw element in the cooling zones may include, for example, small pitch conveying elements, large pitch conveying elements, normal kneading elements, reverse kneading elements, mixing elements, spacers, and combinations thereof. The elements, spacers, and combinations thereof in the cooling zone may depend on factors including, for example, the size of the apparatus, the diameter of the screw element, and combinations thereof. Examples of elements in the cooling zone include 28/14, 28/28, 42/21, 42/42, 25/25, 40/40, 40/60, 60/30, and 60/60. Examples of kneading elements in the cooling zone include KB 45/5/14, KB 45/5/14 Li, KB 45/5/20, KB 45/5/28, KB 45/5/20 Li, and KB 45/5/40.

The temperature of the lubricating composition dispersing zone may be any suitable temperature that provides for a dispersing, for example, a melting, of a soap concentrate of the invention. The temperature of the lubricating composition dispersing zone is generally in a range of from 60° C. to 240° C., preferably in a range of from 70° C. to 230° C., and more preferably in a range of from 80° C. to 220° C.

The lubricating composition mixing zone suitably provides for a mixing of components. Mixing in the lubricating composition mixing zone (referred to herein as lubricating composition mixing) may provide for a mixing of a soap concentrate and a base oil to provide for a base grease mixed composition.

Mixing in the lubricating composition mixing zone may be provided using any means that suitably provides for a process of the invention. Examples of suitable means for mixing in the lubricating composition mixing zone include a screw element and a combination of screw elements.

The temperature of the lubricating composition mixing zone may be any suitable temperature that provides for a mixing of components. The temperature of the lubricating composition mixing zone is generally in a range of from 180° C. to 260° C., preferably in a range of from 180° C. to 240° C., and more preferably in a range of from 190° C. to 240° C.

Regarding the lubricating composition zones, the lubricating composition feeding zone and the lubricating composition cooling zone have been previously described herein. The section of the screw element in the lubricating composition feeding zone may comprise the same types of elements, spacers, and combinations thereof as described herein for the first and second feeding zones. The section of the screw element in the lubricating composition dispersing zone and the lubricating composition mixing zone may comprise the same types of elements, spacers, and combinations thereof as described herein for the first reacting zone and continued reacting zone. The section of the screw element in the lubricating composition cooling zone may comprise the same types of elements, spacers, and combinations thereof as described herein for the cooling zone. The elements, spacers, and combinations thereof in the lubricating composition zones may depend on factors including, for example, the size of the apparatus, the screw element diameter, and combinations thereof.

The temperature of the various zones described herein may be maintained by any suitable means for heat exchanging known in the art. Examples of suitable means for heat exchanging include electrical heaters, fuel heaters, ceramic heaters, calrod heaters, coil-type heaters, and combinations thereof. A preferred means for heat exchanging is an electrical heater.

For example, when the various zones comprise barrels, the means for heat exchanging may generally comprise a passage, for example, a channel, a chamber, a bore, and combinations thereof in the barrel for carrying selected heat transfer media. The means for heat exchanging may be an electrical heater, for example, a calrod or coil-type heater. The means for heat exchanging generally are circumferentially located in or adjacent each barrel around the bore or central opening which houses a screw element. Such means for heat exchanging, while preferably close to the central opening, may be placed around the exterior part of the individual barrels in a coil-like manner, for example, insulated electrical heaters. Means for heat exchanging may also be placed in or along the shaft of a screw element. A preferred type of means for heat exchanging is a passage carrying heat transfer media. Any fluid may be used as the heat transfer media, for example, water, petroleum oils, and combinations thereof, and selecting a heat transfer media will depend on the particular temperature desired and the ease of handling in an apparatus and a process of the invention.

The means for heat exchanging as disclosed herein may provide for heating, cooling, or a combination thereof.

The zones described herein may comprise any suitable structure that provides for a process of the invention. Examples of suitable structures include reactor vessels, a series of individual barrels, and combinations thereof. A preferred structure comprises a series of individual barrels. A more preferred structure comprises a series of individual barrels that are adjacent to one another and longitudinally connected to allow for the different operative steps to be sequentially performed. Generally, the series of individual barrels house a screw element or a combination of screw elements that runs through the entire length of the series of individual barrels.

Examples of a suitable screw element include a single-screw element, a twin-screw element in a counter-rotating configuration, and a twin-screw element in a co-rotating configuration. Preferably a screw element comprises a twin-screw element in a co-rotating configuration. Any commercial twin-screw co-rotating extruder that may provide for a process of the invention may be utilized. Also, any commercial twin-rotor continuous mixer that may provide for a process of the invention may be utilized.

Examples of a suitable commercial twin-screw co-rotating extruder for preparing a composition, for example, a soap concentrate, a base grease, a finished grease, or a combination thereof, according to a process of the invention include a 40-mm twin-screw co-rotating extruder from Coperion Werner and Pfleiderer, Stuttgart, Germany, having model number ZSK40MC, a 34-mm, Mega Volume twin-screw co-rotating extruder from Coperion Werner and Pfleiderer, Stuttgart, Germany, having model number ZSK34MV, a 62-mm twin-screw co-rotating extruder from Coperion Werner and Pfleiderer, Stuttgart, Germany, having model number ZSK62, and a 125-mm twin-screw co-rotating extruder from Coperion Werner and Pfleiderer, Stuttgart, Germany, having model number ZSK125.

Examples of a suitable commercial continuous mixer include the FCM from Farell Corporation, Ansonia, Conn., USA and the CMP and CIM series from Japan Steel Works, Hiroshima, Japan.

A screw element of the invention may comprise various segments of different sizes, shapes, angles, and configurations as described herein that may help provide for the various processes to be conducted in the various zones. The screw element comprising various segments may provide for the various processes of the zones to be conducted along the length of the screw element by the selection of the various sizes, shapes, angles, and configurations of the screw element.

When a screw element is utilized, an apparatus of the invention further comprises a means for driving the screw element. The means for driving the screw element may be any suitable means that provides for a process of the invention. Examples of suitable means for driving the screw element include an electric motor, a fuel motor, and combinations thereof. A preferred means for driving the screw element is an electric motor.

When an apparatus of the invention comprises a screw element, the screw speed may be any speed that suitably provides for a process of the invention to provide for a composition, for example, a soap concentrate, a base grease, a finished grease, or a combination thereof. The screw speed is generally in a range of from 50 revolutions per minute (rpm) to 1200 rpm, preferably in a range of from 250 rpm to 700 rpm, and more preferably in a range of from 300 rpm to 600 rpm.

When an apparatus of the invention comprises a screw element, the apparatus may further comprise a side apparatus. Examples of a suitable side apparatus include a side-feeder, a side devolatilization apparatus, and combinations thereof. The term "side apparatus" is used herein to generally indicate that a side apparatus is located at a side of an apparatus of the invention. The term should not be construed as limiting as a side apparatus may be located at other locations of an apparatus of the invention for example, on a top-side of an apparatus of the invention. A side apparatus, for example a side-feeder, may further comprise a vacuum source, for example, by connecting the side apparatus to a vacuum pump. A side devolatilization apparatus generally comprises a vacuum source as part of the apparatus and may not need further connecting to, for example, a vacuum pump. Examples of a suitable side-feeder include a side-feeder comprising a screw element and a side-feeder comprising a twin-screw in a co-rotating configuration, preferably a side-feeder comprising a twin-screw in a co-rotating configuration. Examples of a suitable side devolatilization apparatus include an apparatus comprising a screw element and an apparatus comprising a twin-screw in a co-rotating configuration, preferably an apparatus comprising a twin-screw in a co-rotating configuration.

Generally, a side-feeder or a side devolatilization apparatus may be of a type used in polymer processing. An example suitable commercial side-feeder comprises a twin-screw in a co-rotating configuration commercially available from Coperion Werner and Pfleiderer, Stuttgart, Germany having model number ZSB40. When an apparatus of the invention comprises one or more side-feeders, preferably the one or more side-feeders each comprise a twin-screw in a co-rotating configuration. When an apparatus of the invention comprises one or more side devolatilization apparatus, preferably the one or more side devolatilization apparatus each comprise a twin-screw in a co-rotating configuration.

A side apparatus, for example a side-feeder, a side devolatilization apparatus, or a combination thereof, may be located in an apparatus of the invention to suitably provide, for example, an increase in efficiency of the process, an increase in the rate of throughput, or a combination thereof. For example, when an apparatus of the invention comprises a screw element, a side apparatus, for example, a side-feeder, a side devolatilization apparatus, or a combination thereof, may be utilized in place of one or more vents that may provide, for example, a reduction in soap discharge from the venting zones.

A side-feeder may comprise a means for driving the side-feeder. A side devolatilization apparatus may comprise a means for driving the side devolatilization apparatus. The means for driving may be any means that provides for a process of the invention. Examples of suitable means for driving include an electric motor, a fuel motor, and combinations thereof, preferably an electric motor.

The total rate of throughput of components through an apparatus of the invention generally depends on factors including, for example, the quantity of composition, for example, soap concentrate, base grease, finished grease, or a combination thereof, that is to be produced, the size of the apparatus, the screw element diameter, and combinations thereof. For example, a small commercial twin-screw co-rotating extruder may provide for a low rate of throughput of components whereas a large commercial twin-screw co-rotating extruder may provide for a higher rate of throughput of components. An auger that pushes feed components into the feeding zones may also be used to increase the throughput of components.

When an apparatus of the invention comprises a series of individual barrels that are adjacent to one another and longitudinally connected to allow for the different operative steps to be sequentially performed and housing a screw element that runs through the entire length of the series of individual barrels, the number of barrels may be any number that suitably provides for a process of the invention. The size and number of barrels generally depends on a variety of factors including, for example, the quantity of composition to be prepared, the rate of producing the composition, the size of the screw element, the number of process steps to be conducted, and combinations thereof.

The number of barrels utilized when preparing a soap concentrate, a base grease, a finished grease, or a combination thereof, according to a process of the invention is generally in the range of from 5 barrels to 25 barrels, preferably in the range of from 7 to 20 barrels, and more preferably in the range of from 10 to 18 barrels. A preferred apparatus of the invention for use in preparing a soap concentrate comprises 18 barrels. A preferred apparatus of the invention for use in preparing a base grease, a finished grease, or a combination thereof, comprises 10 barrels.

An apparatus of the invention may comprise an inert gas sweep, also referred to as an inert gas blanketing. For example, an inert gas sweep may help protect the soap concentrate from oxidation. Examples of a suitable inert gas include nitrogen, argon, and combinations thereof. Preferably, the inert gas is nitrogen. The rate of the inert gas sweep may be any rate that suitably provides for a process of the invention. The rate of the sweep gas is generally in a range of from 0.01 milliliters per second (mL/sec) to 10 liters per second (L/sec), preferably in a range of from 1 mL/sec to 5 L/sec, and more preferably in a range of from 10 mL/sec to 1 L/sec. The inert gas sweep or blanketing may help minimize the ingress of air. The feeding zones, for example, the first feeding zone, the second feeding zone, and combinations thereof, may comprise an inert gas sweep to minimize the ingress of air into the feeding zones.

Generally, a soap concentrate of the invention may comprise any shape that suitably provides for a base grease, a finished grease, or a combination thereof utilizing conventional reconstitution techniques, an apparatus and process of the invention, or a combination thereof. Examples of a suitable shape include particles, thin film, powder, and combinations thereof. For example, the soap concentrate may comprise an extrudate. The soap concentrate may be subjected to various shaping techniques to provide for additional shapes, for example, powders, fine particles, and combinations thereof. The particle size of soap concentrate may be any particle size suitable for producing a base grease, a finished grease, or a combination thereof utilizing conventional reconstitution techniques, an apparatus and process of the invention, or a combination thereof. The particle size of a soap concentrate is generally in a range of from 0.1 millimeters (mm) to 50 mm, preferably in a range of from 0.1 mm to 25 mm, and more preferably in a range of from 0.1 mm to 10 mm. A soap concentrate of the invention is preferably in the form of a powder or fine particle.

An example process of the invention comprises preparing a soap concentrate utilizing an apparatus comprising a screw element, preferably a twin-screw element in a co-rotating configuration, more preferably an apparatus comprising a twin-screw co-rotating extruder. The resulting soap concentrate may then be utilized to provide for a lubricating composition selected from the group consisting of a base grease, a finished grease, and combinations thereof using conventional reconstitution techniques. Examples of suitable conventional reconstitution techniques include any type of reconstitution techniques that suitably provides for a lubricating composition, generally batch processing.

Batch processing generally involves the use of large kettles, typically in the range of from 2,200 liters to 11,355 liters, or 2,000 kilograms to 13,608 kilograms capacity, with paddle agitation. Examples of suitable kettles include open kettles, pressurized kettles, and combinations thereof. The reconstitution to provide for a lubricating composition may take place at the same location as the preparing of the soap concentrate or at a different location(s) than the preparing of the soap concentrate.

Another example process of the invention comprises preparing a soap concentrate utilizing an apparatus of the invention comprising a screw element. The resulting soap concentrate may then be utilized to provide for a lubricating composition, for example, a base grease, a finished grease, or a combination thereof, using the same apparatus of the invention or a separate apparatus of the invention comprising a screw element. The production of the lubricating composition may take place at the same location as the preparing of the soap concentrate or at a different location(s) than the preparing of the soap concentrate. For example, an apparatus of the invention comprising soap concentrate zones as described herein may be modified to provide for lubricating composition zones as described herein. Also for example, one apparatus of the invention comprising soap concentrate zones may be utilized to provide for a soap concentrate. The soap concentrate may then be utilized in a separate apparatus of the invention comprising lubricating composition zones to provide for a lubricating composition.

Another example process of the invention comprises preparing a soap concentrate utilizing an apparatus of the invention comprising a screw element. The resulting soap concentrate may then be utilized to provide for a lubricating composition, for example, a base grease, a finished grease, or a combination thereof, using one or more additional separate apparatus(es) of the invention comprising a screw element. For example, one apparatus of the invention comprising lubricating composition zones may be utilized for the production of a base grease and another apparatus of the invention comprising a static mixer, a homogenizer, a screen pack, or a combination thereof may be utilized for the production of a finished grease. The production of the base grease and finished grease may take place at the same location as the preparing of the soap concentrate or at a different location(s) than the preparing of the soap concentrate. In addition, the production of the finished grease may take place at the same location as the preparing of the base grease or at a different location(s) than the preparing of the base grease.

As may be seen from, but not limited by, the example processes of the invention, the invention provides for flexibility in the production of various compositions.

Storing and transporting a soap concentrate, a base grease, a finished grease, or a combination thereof prepared according to the invention may be conducted utilizing any temperature and technique used in the art of storing and transporting soap concentrates, base greases, finished greases, or combinations thereof. Examples of storing and transporting include the use of drums, pails, totes, and combinations thereof, generally with caustic resistant liners. Storage life may be increased by storing under an inert atmosphere, for example, nitrogen or argon.

FIG. 1 through FIG. 6 disclose one or more embodiments of the invention. For the sake of clarity, typical components utilized in preparing soap concentrates, base greases, finished greases, and combinations thereof, for example, piping, valves, metering devices, pumps, controls, and combinations thereof have been generally omitted. While FIG. 1 through FIG. 6 may disclose flow(s) using one combined flow path, separate individual flow paths may be utilized.

Referring to FIG. 1, a series of zones 10 is disclosed. The dotted lines indicate zones and flow paths that, depending on the type of composition to be produced, for example, a soap concentrate, are optional and may be utilized, may be present and not utilized, or may not be present. Feed components may be introduced via 12 to first feeding zone 30. Feed components may be passed directly from first feeding zone 30 to first reacting zone 36 via 46, for example, when preparing a lithium soap concentrate with no water injecting. Optionally, water injecting zone 32 may be utilized, for example, when preparing a lithium soap concentrate with water injecting, and feed components introduced via 12 to first feeding zone 30 may be passed via 14 to water injecting zone 32. The resulting composition from water injecting zone 32 may be passed directly to first reacting zone 36 via 48. Also optionally, for example, when preparing a lithium complex soap concentrate with no water injecting, feed components may be introduced via 12 to first feeding zone 30 and then passed via 50 to second feeding zone 34. Second feeding zone 34 provides for the addition of one or more initial additives, for example, one or more metal detergents, as described herein. The resulting composition may then be passed via 18 to first reacting zone 36 to provide for a reacted composition. Also optionally, for example, when preparing a lithium complex soap concentrate with water injecting, feed components may be introduced via 12 to first feeding zone 30 and then passed via 14 to water injecting zone 32 and then passed via 16 to second feeding zone 34. The resulting composition may then be passed via 18 to first reacting zone 36 to provide for a reacted composition.

The reacted composition from first reacting zone 36 may then be passed via 20 to first venting zone 38 to provide for a first-vented composition. Optionally, for example when utilizing an extruder that is shorter in length, for example with 14 barrels, the first-vented composition may be passed via 52 to cooling zone 44. Also optionally, for example when utilizing a longer extruder, for example with 18 barrels, the first-vented composition may be passed via 22 to continued reacting zone 40 to provide for a continued-reacted composition. The continued-reacted composition may then be passed via 24 to second venting zone 42 to provide for a second-vented composition. The second-vented composition may then be passed via 26 to cooling zone 44 to provide for a cooled composition. A composition, for example, a soap concentrate of the invention, may then be obtained via 28.

Figure 2:
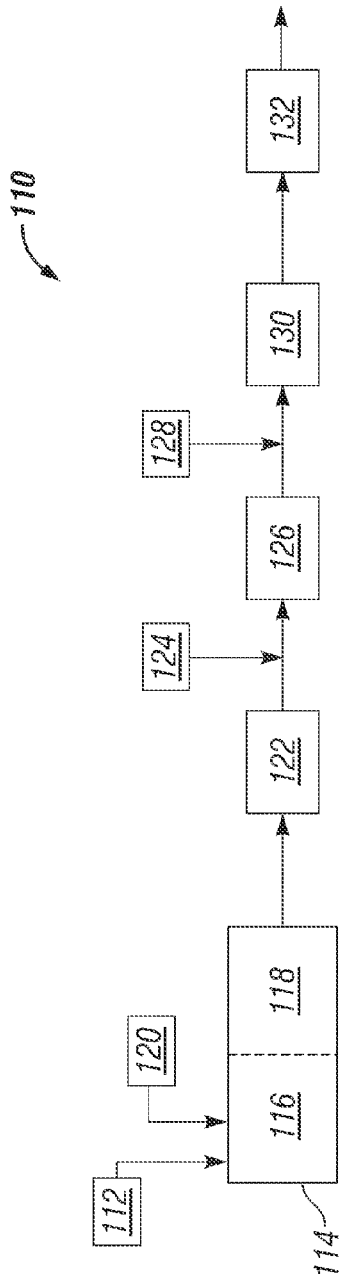
FIG. 2 schematically depicts a process and an apparatus for preparing a lubricating composition according to a process and an apparatus of the invention.

Referring to FIG. 2, an apparatus and process 110 for providing a lubricating composition, for example a base grease or a finished grease is disclosed. A soap concentrate, preferably a soap concentrate prepared according to the invention, in first feeder 112 may be introduced to extruder 114. Extruder 114 comprises section 116 and cooling section 118. Soap concentrate in feeder 112 may be introduced in section 116. Section 116 generally provides for a feeding, a heating, a dispersing of the soap concentrate, and a mixing of components. After an initial heating of the soap concentrate, a base oil in second feeder 120 may be introduced to extruder 114. Base oil in second feeder 120 may be introduced in section 116. The soap concentrate and base oil are fed, mixed, and heated, and the soap concentrate is dispersed, and may then be passed through extruder 114 from section 116 to cooling section 118 where fiber formation occurs. The dotted line in extruder 114 is to indicate the two sections 116 and 118 and is not to be limited to each section comprising half of extruder 114.

For example, if a base grease or concentrated base grease is being produced, one or more additional additives may not be added and a base grease may be obtained from extruder 114 for use or further processing. Also for example, if a finished grease is being produced, the resulting composition from extruder 114 may then be passed to a first static mixer 126 via gear pump 122. Additional base oil may be added via third feeder 124 as needed. The resulting composition may then be passed from first static mixer 126 to second static mixer 130. One or more additional additives may be added from additives containment 128. The resulting composition may then be passed from second static mixer 130 to homogenizer 132. A lubricating composition, generally a finished grease, may then be obtained from homogenizer 132. Pressure gauges (not shown) may be present before and after gear pump 122. Base oil, from third feeder 124, and first static mixer 126 may not be needed if enough base oil is present in extruder 114 provided from second feeder 120.

An example, non-limiting, temperature profile for apparatus and process 110 generally comprises an initial temperature of 90° C. in section 116 when soap concentrate is added. Base oil from second feeder 120 may be added to section 116 at a point where the temperature is in a range of from 100° C.

to 110° C. At a point in the extruder generally between section 116 and cooling section 118 that is, for example, indicated by the dotted line in extruder 114, the temperature is generally 210° C. The temperature at the discharge of extruder 114 is generally 160° C. The temperature gradually decreases from 160° C. to 90° C. as the process continues from the discharge of extruder 114 to the discharge of first static mixer 126 where one or more additional additives may be added from additives containment 128. The temperature may further gradually decrease from 90° C. to a temperature in a range of from 70° C. to 80° C. as the process continues from the discharge of first static mixer 126 to the discharge of homogenizer 132.

Figure 3:
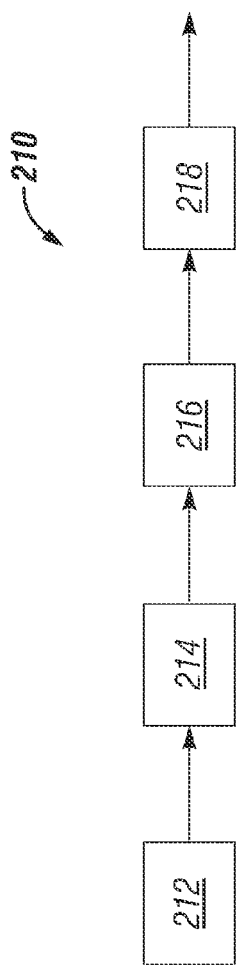
FIG. 3 schematically depicts a process for preparing a lubricating composition according to a process of the invention.

Referring to FIG. 3, a series of zones 210 is disclosed that for example, may be embodied in an extruder, for example, extruder 114 disclosed in FIG. 2. For example, a soap concentrate, preferably a soap concentrate prepared according to a process of the invention, and a base oil may be added to lubricating composition feeding zone 212. The soap concentrate and base oil may then be passed from lubricating composition feeding zone 212 to lubricating composition dispersing zone 214. Lubricating composition dispersing zone 214 provides for a dispersing, for example, a melting, of the soap concentrate. The dispersed soap concentrate and the base oil may then be passed from lubricating composition dispersing zone 214 to lubricating composition mixing zone 216 that provides for a mixing of the dispersed soap concentrate and the base oil. The mixture of dispersed soap concentrate and base oil may then be passed from lubricating composition mixing zone 216 to lubricating composition cooling zone 218 that provides for a cooling, of the mixture of dispersed soap concentrate and base oil, and a forming of fibers. The resulting composition, generally a base grease, from lubricating composition cooling zone 218 may then be passed to further processing as described herein to provide for a finished grease or used as produced.

Figure 4:
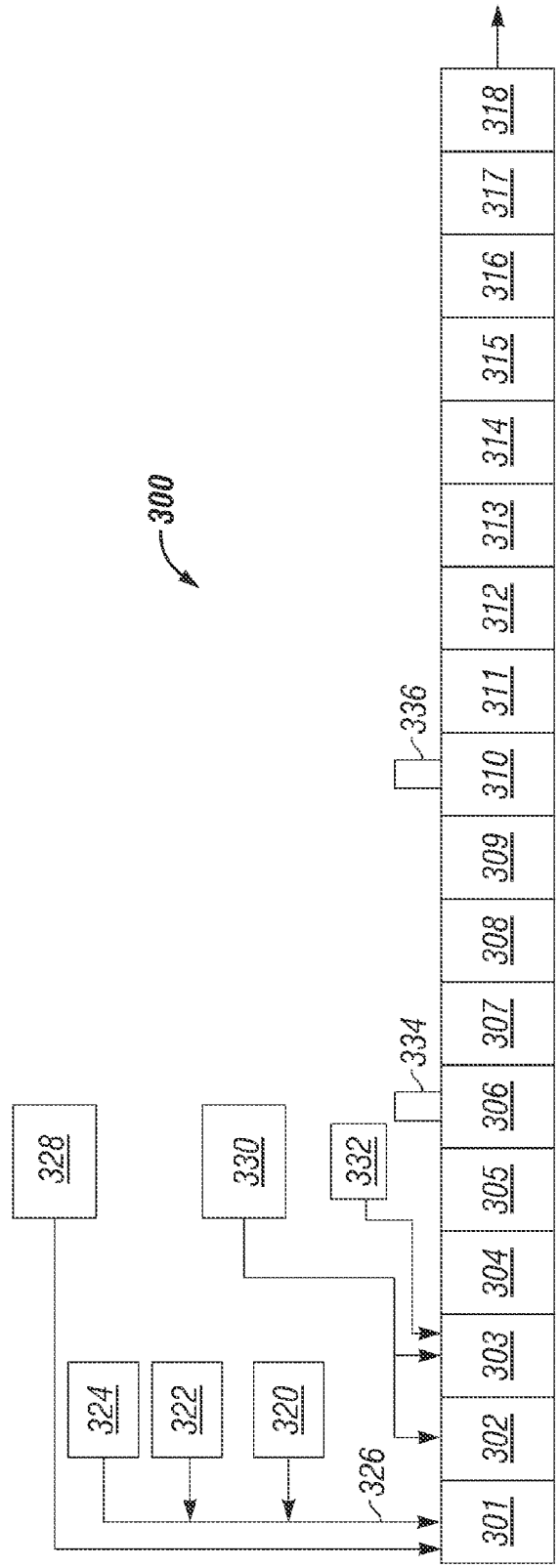
FIG. 4 schematically depicts a process and an apparatus of the invention.

Referring to FIG. 4, a schematic of an apparatus 300 is disclosed comprising a screw element, for example, a twin-screw element in a co-rotating configuration, similar to the apparatus referred to herein in Example 2, to provide for a soap concentrate, preferably a lithium complex soap concentrate. The apparatus 300 comprises a series of eighteen (18) individual barrels that are adjacent to one another and longitudinally connected to allow for the different operative steps to be sequentially performed and housing, for example a twin-screw element in a co-rotating configuration that runs through the entire length of the series of individual barrels. The series of barrels 301-318 comprise several zones. Barrel 301 comprises a first feeding zone. Barrel 302 comprises a water injecting zone. Barrel 303 comprises a second feeding zone. Barrels 304-305 comprise a first reacting zone. Barrel 306 comprises a first venting zone. Barrels 307-309 comprise a continued reacting zone. Barrel 310 comprises a second venting zone. Barrels 311-318 comprise a cooling zone.

In an example process of the invention to provide a lithium complex soap concentrate, hydrogenated castor oil fatty acid (HCOFA) in a first gravimetric feeder 320, lithium hydroxide monohydrate in a second gravimetric feeder 322, and boric acid in a third gravimetric feeder 324 are added via feed components line 326 to barrel 301.

A flush oil system may be optionally utilized to provide flush oil to begin the flow of feed components. Once the flow of feed components is established, the flow of flush oil may be stopped. A flush oil system may be optionally utilized to provide flush oil to clean the apparatus after use. The flush oil system comprises a flush oil containment 328 that provides flush oil to barrel 301.

When water is injected, water may be injected into barrel 302 or barrel 303 or a combination thereof utilizing a water injecting system. The water injecting system comprises a water containment 330 that provides water to barrel 302 or barrel 303 or a combination thereof.

One or more initial additives as described herein, for example, one or more metal detergents, are added to barrel 303 utilizing an initial additive system comprising initial additive containment 332 that provides one or more initial additives to barrel 303. As the process continues through the barrels, venting of the various compositions may be conducted utilizing first vent 334, second vent 336, or a combination of first vent 334 and second vent 336. A lithium complex soap concentrate may be obtained from barrel 318. A lithium complex soap concentrate obtained from barrel 318 may be discharged to a storage container, a die for shaping the concentrate, a grinding system, or a combination thereof.

Example ranges of flow rates that may be utilized during a process utilizing apparatus 300 disclosed in FIG. 4 to provide for a lithium complex soap concentrate include the following: HCOFA: 30 kilograms per hour (kg/hr) to 150 kg/hr; lithium hydroxide monohydrate: 5 kg/hr to 30 kg/hr; boric acid: 10 kg/hr to 30 kg/hr; flush oil: 80 kg/hr to 160 kg/hr; water: $6.3 \times 10^{-4}$ liters per second to $2.2 \times 10^{-2}$ liters per second; and one or more initial additives: 15 kg/hr to 35 kg/hr. The example ranges of flow rates are not to be construed as limiting the invention.

A sweep gas may be utilized during use of the apparatus of FIG. 4. The sweep gas may be provided by, for example, a sweep gas system as described herein for FIG. 6 (see, for example, feature 526).

Figure 5:
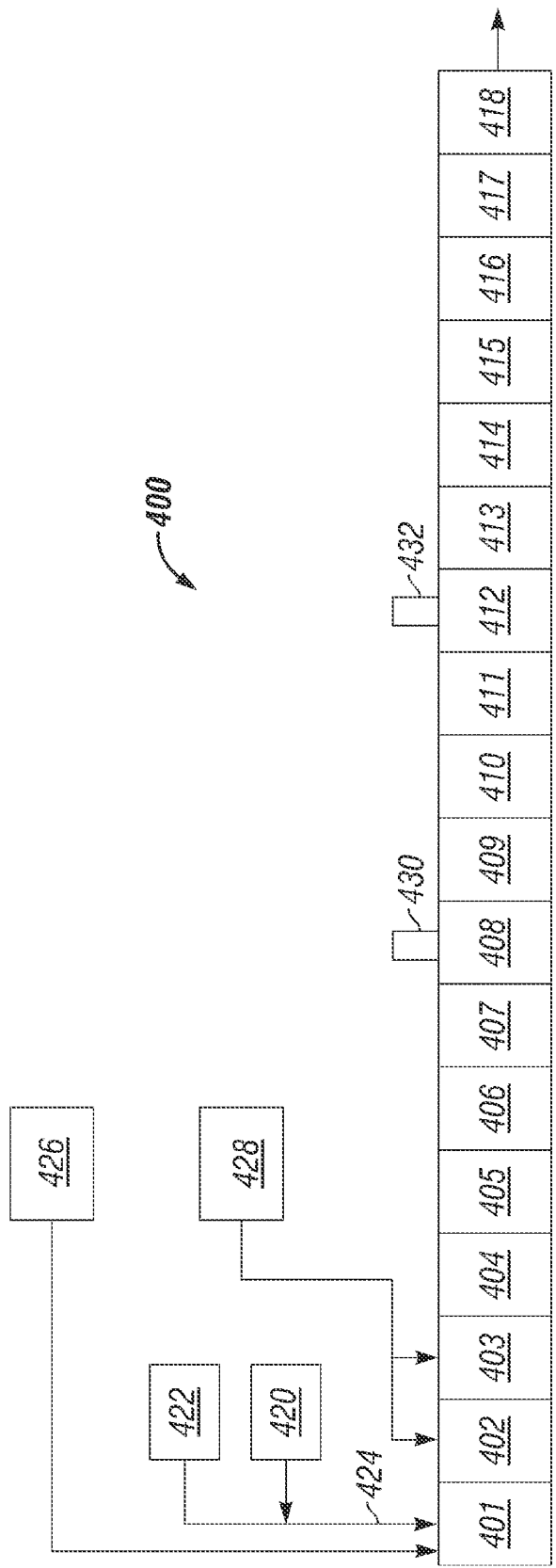
FIG. 5 schematically depicts a process and an apparatus of the invention.

Referring to FIG. 5, a schematic of an apparatus 400 is disclosed comprising a screw element, for example, a twin-screw element in a co-rotating configuration, similar to the apparatus referred to herein in Example 2, to provide for a soap concentrate, preferably a lithium soap concentrate. Apparatus 400 comprises a series of eighteen (18) individual barrels that are adjacent to one another and longitudinally connected to allow for the different operative steps to be sequentially performed and housing, for example, a twin-screw in a co-rotating configuration that runs through the entire length of the series of individual barrels. The series of barrels 401-418 comprise several zones. Barrel 401 comprises a first feeding zone. Barrels 402-403 comprise a water injecting zone. Barrels 404-407 comprise a first reacting zone. Barrel 408 comprises a first venting zone. Barrels 409-411 comprise a continued reacting zone. Barrel 412 comprises a second venting zone. Barrels 413-418 comprise a cooling zone.

In an example process of the invention to provide a lithium soap concentrate, hydrogenated castor oil (HCO) in a first gravimetric feeder 420 and lithium hydroxide monohydrate in a second gravimetric feeder 422, are added via feed components line 424 to barrel 401.

A flush oil system may be optionally utilized to provide flush oil to begin the flow of feed components. Once the flow of feed components is established, the flow of flush oil may be stopped. A flush oil system may be optionally utilized to provide flush oil to clean the apparatus after use. The flush oil system comprises a flush oil containment 426 that may provide flush oil to barrel 401.

When water is injected, water may be injected into barrel 402 or barrel 403 or a combination thereof utilizing a water injecting system. The water injecting system comprises a water containment 428 that provides water to barrel 402 or barrel 403 or a combination thereof.

As the process continues through the barrels, venting of the various compositions may be conducted utilizing first vent 430 or second vent 432 or a combination thereof. A lithium soap concentrate may be obtained from barrel 418. A lithium soap concentrate obtained from barrel 418 may be discharged to a storage container, a die for shaping the concentrate, a grinding system, or a combination thereof.

Example ranges of flow rates that may be utilized during a process utilizing apparatus 400 disclosed in FIG. 5 to provide for a lithium soap concentrate include the following: HCO: 30 kilograms per hour (kg/hr) to 150 kg/hr; lithium hydroxide monohydrate: 5 kg/hr to 30 kg/hr; flush oil: 80 kg/hr to 160 kg/hr; and water: $6.3 \times 10^{-4}$ liters per second to $2.2 \times 10^{-2}$ liters per second. The example ranges of flow rates are not to be construed as limiting the invention.

A sweep gas may be utilized during use of the apparatus of FIG. 5. The sweep gas may be provided by, for example, a sweep gas system as described herein for FIG. 6 (see, for example, feature 526).

Figure 6:
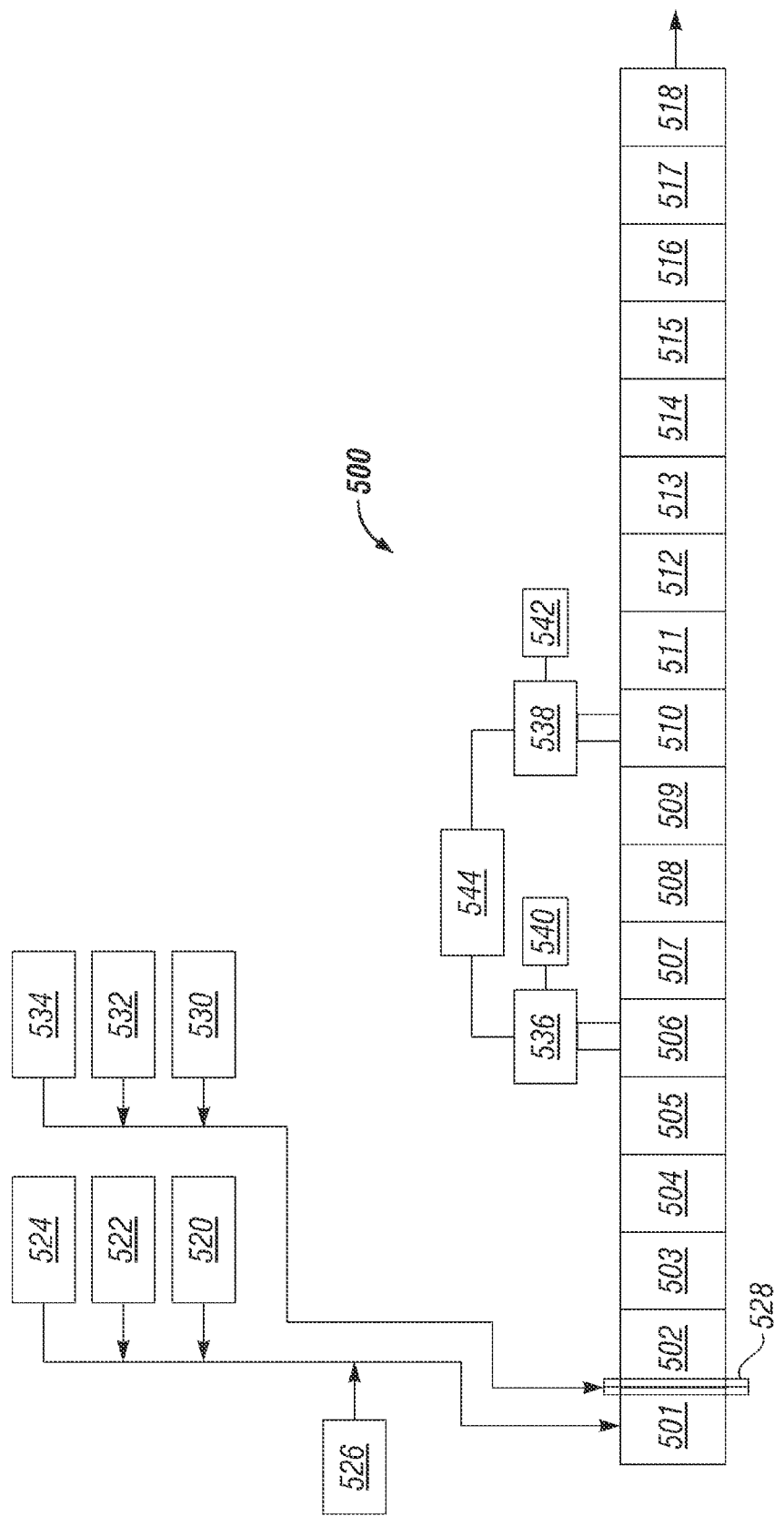
FIG. 6 schematically depicts a process and an apparatus of the invention.

Referring to FIG. 6, a schematic of an apparatus 500 is disclosed comprising a screw element, for example, a twin-screw element in a co-rotating configuration, similar to the apparatus referred to herein in Example 3, to provide for a soap concentrate, preferably a lithium complex soap concentrate. Apparatus 500 comprises a series of 18 individual barrels that may be adjacent to one another and longitudinally connected to allow for the different operative steps to be sequentially performed and housing, for example, a twin-screw in a co-rotating configuration that runs through the entire length of the series of individual barrels. The series of barrels 501-518 comprise several zones. Barrel 501 comprises a first feeding zone. Barrel 502 comprises a water injecting zone and a second feeding zone. After barrel 501 and before barrel 502, an adapter plate 528 may be utilized to provide for a water injecting and a feeding of one or more initial additives. Barrels 503-505 comprise a first reacting zone. Barrel 506 comprises a first venting zone. Barrels 507-509 comprise a continued reacting zone. Barrel 510 comprises a second venting zone. Barrels 511-518 comprise a cooling zone.

In an example process of the invention to provide a lithium complex soap concentrate, hydrogenated castor oil fatty acid (HCOFA) in a first gravimetric feeder 520, lithium hydroxide monohydrate in a second gravimetric feeder 522, and boric acid in a third gravimetric feeder 524 are added to barrel 501. A sweep gas comprising nitrogen is introduced to the apparatus from sweep gas source 526.

A flush oil system may be optionally utilized to provide flush oil to begin the flow of feed components. Once the flow of feed components is established, the flow of flush oil may be stopped. A flush oil system may be optionally utilized to provide flush oil to clean the apparatus after use. The flush oil system comprises a flush oil containment 530 that provides flush oil to apparatus 500.

When water is injected, water may be added at a location approximately between barrels 501 and 502 at adapter plate 528 utilizing a water injecting system. The water injecting system comprises water containment 532 that provides water to the apparatus. Water may be provided utilizing a water injection nozzle (not shown). One or more initial additives as described herein may be added at a location approximately between barrels 501 and 502 at adapter plate 528 utilizing an initial additive system comprising initial additive containment 534 that provides one or more initial additives, for example, one or more metal detergents as described herein, to apparatus 500. Optionally, one or more initial additives may be added at barrel 503 instead of at adapter plate 528 in a manner similar to the initial additive system as described herein in FIG. 4 (see, for example, feature 332).

The apparatus of FIG. 6 additionally comprises one or more side-feeders, for example side-feeders 536 and 538, each comprising, for example, a twin-screw co-rotating extruder. Side-feeder 536 may be located at barrel 506 and side-feeder 538 may be located at barrel 510. Side-feeder 536 comprises means for driving 540 comprising, for example, an electric motor. Side-feeder 538 comprises means for driving 542 comprising, for example, an electric motor. Side-feeder 536 and side-feeder 538 may be connected to means for venting 544 comprising, for example, a vacuum pump. As the process continues through the barrels, venting of the various compositions may be conducted utilizing side-feeder 536, side feeder 538, or a combination thereof. A lithium complex soap concentrate may be obtained from barrel 518. A lithium complex soap concentrate obtained from barrel 518 may be discharged to a storage container, a die for shaping the concentrate, a grinding system, or a combination thereof.

Example ranges of flow rates that may be utilized during a process utilizing apparatus 500 disclosed in FIG. 6 to provide for a lithium complex soap concentrate include the following: HCOFA: 30 kilograms per hour (kg/hr) to 150 kg/hr; lithium hydroxide monohydrate: 5 kg/hr to 30 kg/hr; boric acid: 10 kg/hr to 30 kg/hr; flush oil: 80 kg/hr to 160 kg/hr; water: $6.3 \times 10^{-4}$ liters per second to $2.2 \times 10^{-2}$ liters per second; one or more initial additives: 15 kg/hr to 35 kg/hr; and sweep gas: 0 liters per second to 15 liters per second. The example ranges of flow rates are not to be construed as limiting the invention.

EXAMPLE 1

Three types of soap concentrates were prepared: lithium (Li), lithium-calcium (LiCa) and lithium complex (LiCx) at different levels of concentration both with and without water.

A 40-mm twin-screw co-rotating extruder from Coperion Werner and Pfleiderer, Stuttgart, Germany having model number ZSK40 was used. The extruder included 14 barrels. The barrels were configured as follows:

Saponification section: Barrel 1—open barrel equipped with a funnel for injection of raw materials; Barrels 2 through 8—closed barrels.
Venting section: Barrels 9 and 10—open barrels.
Cooling section: Barrels 11-14—closed barrels.
At the end of the outlet, the extruder was equipped with an end plate that was removed.
Screw Configuration:
The length of the screw was 2310 mm with a screw configuration as disclosed in Table 1.
The length of each barrel was 165 mm. In Table 1, the length and running total are in millimeters (mm).

TABLE 1

| Screw Configuration 1 | | | | | |
|---|---|---|---|---|---|
| Pos. | Element | Pitch | Length | Running Total | Barrel | Barrel Pos. |
| 1 | 25/25 | 25 | 25 | 25 | BBL1 | |
| 2 | 60/60 | 60 | 60 | 85 | | |
| 3 | 60/60 | 60 | 60 | 145 | | |
| 4 | 60/60 | 60 | 60 | 205 | BBL2 | 165 |
| 5 | 60/60 | 60 | 60 | 265 | | |
| 6 | 60/60 | 60 | 60 | 325 | | |
| 7 | 60/30 | 60 | 30 | 355 | BBL3 | 330 |
| 8 | 40/40 | 40 | 40 | 395 | | |
| 9 | 40/40 | 40 | 40 | 435 | | |
| 10 | 40/20 | 40 | 20 | 455 | | |
| 11 | KB 45/5/40 | | 40 | 495 | BBL4 | 495 |
| 12 | KB 45/5/20 Li | | 20 | 515 | | |
| 13 | 40/40 | 40 | 40 | 555 | | |
| 14 | KB 45/5/40 | | 40 | 595 | | |
| 15 | KB 45/5/20 Li | | 20 | 615 | | |
| 16 | 40/40 | 40 | 40 | 655 | BBL5 | 660 |
| 17 | KB 45/5/40 | | 40 | 695 | | |
| 18 | KB 45/5/20 Li | | 20 | 715 | | |
| 19 | 40/40 | 40 | 40 | 755 | | |
| 20 | KB 45/5/40 | 40 | 40 | 795 | | |
| 21 | KB45/5/20 Li | | 20 | 815 | BBL6 | 825 |
| 22 | 40/40 | 40 | 40 | 855 | | |

TABLE 1-continued

Screw Configuration 1

| Pos. | Element | Pitch | Length | Running Total | Barrel | Barrel Pos. |
|---|---|---|---|---|---|---|
| 23 | KB 45/5/40 | | 40 | 895 | | |
| 24 | KB 45/5/20 Li | | 20 | 915 | | |
| 25 | 40/40 | 40 | 40 | 955 | | |
| 26 | KB 45/5/40 | | 40 | 995 | BBL7 | 990 |
| 27 | KB 45/5/20 Li | | 20 | 1015 | | |
| 28 | 40/40 | 40 | 40 | 1055 | | |
| 29 | TME/60 | | 60 | 1115 | | |
| 30 | TME/60 | | 60 | 1175 | BBL8 | 1155 |
| 31 | KB 45/5/40 | | 40 | 1215 | | |
| 32 | KB 45/5/20 | | 20 | 1235 | | |
| 33 | KB 45/5/20 | | 20 | 1255 | | |
| 34 | KB 45/5/20 | | 20 | 1275 | | |
| 35 | KB 45/5/20 Li | | 20 | 1295 | | |
| 36 | 40/20 Li | 40 | 20 | 1315 | BBL9 | 1320 |
| 37 | 60/60 | 60 | 60 | 1375 | | |
| 38 | 60/60 | 60 | 60 | 1435 | | |
| 39 | 60/60 | 60 | 60 | 1495 | BBL10 | 1485 |
| 40 | 60/60 | 60 | 60 | 1555 | | |
| 41 | 60/60 | 60 | 60 | 1615 | | |
| 42 | 60/30 | 60 | 30 | 1645 | BBL11 | 1650 |
| 43 | 40/40 | 40 | 40 | 1685 | | |
| 44 | KB 45/5/20 | | 20 | 1705 | | |
| 45 | KB 45/5/20 | | 20 | 1725 | | |
| 46 | KB 45/5/20 Li | | 20 | 1745 | | |
| 46 | 40/40 | 40 | 40 | 1765 | | |
| 47 | KB 45/5/40 | | 40 | 1805 | BBL12 | 1815 |
| 48 | KB 45/5/20 Li | | 20 | 1825 | | |
| 49 | 40/40 | 40 | 40 | 1865 | | |
| 50 | KB 45/5/60 | | 60 | 1925 | | |
| 51 | KB 45/5/20 Li | | 20 | 1945 | | |
| 52 | 40/40 | 40 | 40 | 1985 | BBL13 | 1980 |
| 53 | KB 45/5/60 | | 60 | 2045 | | |
| 54 | KB 45/5/20 Li | | 20 | 2065 | | |
| 55 | 60/60 | 60 | 60 | 2125 | | |
| 56 | 60/60 | 60 | 60 | 2185 | BBL14 | 2145 |
| 57 | 40/40 | 40 | 40 | 2225 | | |
| 58 | 40/40 | 40 | 40 | 2265 | | |
| 59 | 40/20 | 40 | 20 | 2285 | | |
| 60 | SME 25/25 | 25 | 25 | 2310 | | |

A control system was used to regulate the heat input to each zone. A variable speed DC motor was used to drive the screw shafts with the screw speed maintained at a specified set point. The first barrel was not heated.

To introduce solids, three feeders from K-TRON International, Inc., Pitman, N.J., USA were utilized. The base oil was introduced into the extruder by a gear pump. Two peristaltic pumps were used to add the water and dispersing agents. The "dispersing agents" referred to herein in Example 1 were a blend of two commercially available metal detergents with each metal detergent being present in an amount of 50 weight percent of the blend. The first metal detergent comprised 50 weight percent overbased calcium alkyl salicylate in mineral oil from Infineum, Abingdon, United Kingdom. The second metal detergent comprised 54 weight percent calcium carbonate tall-oil fatty acids complex in hydrocarbon solvent from Rhodia, Paris, France. Throughout production, the screw rotational speed was approximately 300 rpm.

The temperature profile disclosed in Table 2 was used for Screw Configuration 1 with two venting barrels for Li, LiCa, and LiCx soap concentrates.

TABLE 2

| | Barrel | | | | | | |
|---|---|---|---|---|---|---|---|
| | 1 | 2 | 3 | 4 | 5 | 6 | 7 |
| Temp. (° C.) | (1) | 70 | 95 | 130 | 150 | 170 | 185 |

| | Barrel | | | | | | |
|---|---|---|---|---|---|---|---|
| | 8 | 9 | 10 | 11 | 12 | 13 | 14 |
| Temp. (° C.) | 210 | 230 | 230 | 195 | 170 | 140 | 110 |

Note:
(1) no heating/cooling available

The following total flow rates were used with Screw Configuration 1:
Li: up to 10 kg/h to obtain a 100% soap concentrate;
LiCa: up to 10 kg/h to obtain a 100% soap concentrate; and
LiCx: up to 8 kg/h to obtain a 100% soap concentrate. The LiCx soap concentrate had a lower flow rate compared to Li soap concentrate. Since more solids were added for the LiCx soap concentrate, more water was added in order to get the same water:solid ratio as for the Li and LiCa soap concentrates. The flow rates for production of each soap concentrate were obtained at the end of the trial. For each of the three different soap concentrates, Li, LiCa, and LiCx, different samples were produced with the following parameters.
Amount of soap concentrate: 50%, 75%, and 100% of soap concentrate (the soap concentrate corresponds to the sum of all ingredients taking part in the saponification and complexation reactions).
The water-to-solid ratio: zero-to-one (0:1) and one-to-one (1:1).
The barrel temperature at top temperature (venting zone): 180° C., 200° C., and 230° C.

When the top temperature was below 200° C. (barrel temp.), the soap concentrate was too hard for easy water release. LiCx soap concentrate was not manufactured at 180° C. When no water was added to manufacture the three types of soap concentrate, the soap concentrates were observed to be softer based on a visual observation at the outlet of the extruder. Two temperatures were checked for the LiCa soap concentrate: 230° C. and 200° C. Li soap concentrate was made with HCO or HCOFA. LiCa soap concentrate was made with and without glycerol. LiCx concentrate was made with and without the dispersing agents.

The soap concentrate was very hot at the outlet (greater than approximately 140° C. to approximately 150° C.). The resulting concentrate was spread on a metal plate for quick cooling before filling in a drum. Such procedure was done for all soap concentrate samples described herein in Examples 1 and 2. It was observed on a few occasions that the hot soap concentrate was "burnt" when in contact with air (brownish color). The discoloration was corrected after nitrogen blanketing of the venting zones.

A Li soap concentrate utilizing HCO was produced at different flow rates and the results are shown in Table 3. A Li soap concentrate was produced utilizing HCOFA and the results are shown in Table 4. A LiCa soap concentrate was produced with and without glycerol and the results are shown in Table 5. A LiCx soap concentrate containing the dispersing agents was produced and the results are shown in Table 6. The results disclosed in Tables 3, 4, 5, and 6 demonstrate that a process and apparatus of the invention may provide for a 100% soap concentrate.

Saponification was determined by Fourier Transform Infra Red (FTIR, also referred to as I.R.).

Alkalinity was determined as weight percent free LiOH utilizing British Institute of Petroleum Standard IP 37. IP 37 was strictly applied for the lithium greases and was slightly modified for the lithium complex greases by adding 5 grams of glycerol to the other reagents in the first step of IP 37. "Theoretical alkalinity" refers to alkalinity calculated from the stoichiometry and feed flow rates and taking into account the purity of the feed components.

TABLE 3

Li soap concentrate with HCO

ZSK40

|  |  | sample 1 | sample 2 | sample 3 | sample 4 | sample 5 | sample 6 |
|---|---|---|---|---|---|---|---|
| Top Temperature | °C. | 180 | 180 | 180 | 180 | 180 | 180 |
| Water:Solid ratio |  | 1.2 | 0.0 | 0.0 | 1.2 | 1.2 | 0.0 |
| HCO | wt % | 50.8 | 51.3 | 76.0 | 76.0 | 87.5 | 87.4 |
| LiOH, H2O | wt % | 7.3 | 7.3 | 10.8 | 10.9 | 12.5 | 12.6 |
| Base oil | wt % | 41.9 | 41.4 | 13.2 | 13.1 | 0.0 | 0.0 |
| TOTAL | wt % | 100.0 | 100.0 | 100.0 | 100.0 | 100.0 | 100.0 |
| Flow rate | g/h | 10035 | 9960 | 6755 | 6722 | 5833 | 5832 |
| Soap content |  | 58.1 | 58.6 | 86.8 | 86.9 | 100.0 | 100.0 |
| theoretical alkalinity | wt % LiOH | 0.25 | 0.25 | 0.38 | 0.38 | 0.44 | 0.44 |
| I.R. Saponification Rate | % | 99.1 | 98.6 | 96.7 | 97.7 | 99.3 | 99.1 |

ZSK40

|  |  | sample 7 | sample 8 | sample 9 | sample 10 | Average |
|---|---|---|---|---|---|---|
| Time after the start of the run | minute | 60 | 180 | 260 | 320 |  |
| Top Temperature | °C. |  |  | 230 |  |  |
| Water:Solid ratio |  | 1.0 | 1.0 | 1.0 | 1.0 | 1.0 |
| HCO | wt % | 87.3 | 86.9 | 87.3 | 87.5 | 87.2 |
| LiOH, H2O | wt % | 12.7 | 13.1 | 12.7 | 12.5 | 12.8 |
| Base oil | wt % | 0.0 | 0.0 | 0.0 | 0.0 | 0.0 |
| TOTAL | wt % | 100.0 | 100.0 | 100.0 | 100.0 | 100.0 |
| Flow rate | g/h | 5905 | 5820 | 10026 | 10050 |  |
| Soap content |  | 100.0 | 100.0 | 100.0 | 100.0 | 100.0 |
| theoretical alkalinity | wt % LiOH | 0.25 | 0.25 | 0.38 | 0.38 | 0.32 |
| I.R. Saponification Rate | % | 99.1 | 98.6 | 96.7 | 97.7 | 98.0 |

TABLE 4

Li soap concentrate with HCOFA

|  |  | Sample no. |  |  |  |
|---|---|---|---|---|---|
|  |  | 11 | 12 | 13 | Average |
| Time after the start of the run | minute | 60 | 120 | 180 |  |
| Top Temperature | °C. |  | 230 |  |  |
| Water:Solid ratio |  | 1.0 | 1.0 | 1.0 | 1.0 |
| HCOFA | wt % | 87.1 | 87.3 | 87.0 | 87.1 |
| LiOH, H2O | wt % | 12.9 | 12.7 | 13.0 | 12.9 |
| Base oil | wt % | 0.0 | 0.0 | 0.0 | 0.0 |
| TOTAL | wt % | 100.0 | 100.0 | 100.0 | 100.0 |
| Flow rate | g/h | 10170 | 10108 | 10120 | 10133 |
| Soap content |  | 100 | 100 | 100 | 100 |
| theoretical alkalinity | wt % LiOH | 0.44 | 0.44 | 0.44 | 0.44 |

TABLE 5

LiCa soap concentrate

|  |  | Sample no. | | | | | | | | |
|---|---|---|---|---|---|---|---|---|---|---|
|  |  | 14 | 15 | 16 | 17 | 18 | 19 | 20 | 21 | 22 |
| Top Temperature | °C. | 230 | 230 | 230 | 230 | 230 | 230 | 200 | 200 | 200 |
| Water:Solid ratio |  | 1.0 | 0.0 | 0.0 | 1.0 | 1.2 | 1.0 | 1.0 | 1.3 | 0.0 |
| HCOFA | wt % | 81.9 | 81.8 | 87.3 | 87.4 | 82.4 | 73.9 | 73.4 | 87.3 | 87.3 |
| LiOH, H2O | wt % | 9.1 | 9.2 | 9.7 | 9.6 | 7.5 | 8.0 | 8.1 | 9.7 | 9.7 |
| Ca(OH)2 | wt % | 2.8 | 2.8 | 3.0 | 3.0 | 2.8 | 2.5 | 2.5 | 3.0 | 3.0 |
| Glycerol | wt % | 6.2 | 6.2 | 0.0 | 0.0 | 7.3 | 0.0 | 0.0 | 0.0 | 0.0 |
| Base oil | wt % | 0.0 | 0.0 | 0.0 | 0.0 | 0.0 | 15.6 | 16.0 | 0.0 | 0.0 |
| TOTAL | wt % | 100.0 | 100.0 | 100.0 | 100.0 | 100.0 | 100.0 | 100.0 | 100.0 | 100.0 |
| Flow rate | g/h | 6961 | 6942 | 6523 | 6506 | 6934 | 7710 | 6583 | 5465 | 5436 |
| Soap content |  | 100.0 | 100.0 | 100.0 | 100.0 | 100.0 | 84.4 | 84.0 | 100.0 | 100.0 |
| theoretical alkalinity | wt % LiOH | 0.40 | 0.40 | 0.43 | 0.43 | 0.40 | 0.36 | 0.36 | 0.43 | 0.43 |

TABLE 5-continued

LiCa soap concentrate

| | | Sample no. | | | |
|---|---|---|---|---|---|
| | | 23 | 24 | 25 | Average |
| Time after the start of the run | minute | 90 | 150 | 185 | |
| Top Temperature | ° C. | | | 230 | |
| Water:Solid ratio | | 0.9 | 0.9 | 0.9 | 0.9 |
| HCOFA | wt % | 87.3 | 87.3 | 87.4 | 87.3 |
| LiOH, H2O | wt % | 9.7 | 9.7 | 9.6 | 9.7 |
| Ca(OH)2 | wt % | 3.0 | 3.0 | 3.0 | 3.0 |
| TOTAL | wt % | 100.0 | 100.0 | 100.0 | 100.0 |
| Flow rate | g/h | 9360 | 9304 | 9300 | 9345 |
| Soap content | | 100.0 | 100.0 | 100.0 | 100.0 |
| theoretical alkalinity | wt % LiOH | 0.43 | 0.43 | 0.43 | 0.43 |

TABLE 6

LiCx soap concentrate

| | | Sample no. | | | | | | | | | |
|---|---|---|---|---|---|---|---|---|---|---|---|
| | | 26 | 27 | 28 | 29 | 30 | 31 | 32 | 33 | 34 | 35 |
| | | | | | | Production (time after the start of the run, minutes) | | | | | |
| | | | | | | 30 | 60 | 90 | 120 | 150 | 180 | Average |
| Top Temperature | ° C. | 205 | 230 | 230 | 230 | | | | 230 | | | |
| Water:Solid ratio | | 0.0 | 1.0 | 1.0 | 1.1 | 1.0 | 1.0 | 1.0 | 1.0 | 1.0 | 1.0 | 1.0 |
| HCOFA | wt % | 71.0 | 57.5 | 56.9 | 58.0 | 57.0 | 57.0 | 57.0 | 57.8 | 57.1 | 57.3 | 57.2 |
| LiOH,H2O | wt % | 17.7 | 13.8 | 13.1 | 13.2 | 14.2 | 14.2 | 14.4 | 14.3 | 14.2 | 14.3 | 14.3 |
| H3BO3 | wt % | 11.3 | 8.9 | 8.8 | 9.0 | 8.8 | 8.8 | 8.8 | 8.6 | 8.9 | 8.9 | 8.8 |
| Dispersing agents | wt % | 0.0 | 19.8 | 21.2 | 19.8 | 20.0 | 20.0 | 19.8 | 19.3 | 19.8 | 19.5 | 19.7 |
| Base oil | wt % | 0.0 | 0.0 | 0.0 | 0.0 | 0.0 | 0.0 | 0.0 | 0.0 | 0.0 | 0.0 | 0.0 |
| TOTAL | wt % | 100.0 | 100.0 | 100.0 | 100.0 | 100.0 | 100.0 | 100.0 | 100.0 | 100.0 | 100.0 | 100.0 |
| Flow rate | g/h | 6273 | 7996 | 8123 | 7884 | 8051 | 8024 | 8075 | 8247 | 7987 | 7993 | 8063 |
| Soap content | | 100 | 100 | 100 | 100 | 100 | 100 | 100 | 100 | 100 | 100 | 100 |
| theoretical alkalinity | wt % LiOH | 0.04 | 0.58 | 0.36 | 0.14 | 0.57 | 0.86 | 0.97 | 0.92 | 0.87 | 0.86 | 0.84 |
| alkalinity | wt % LiOH | | 0.49 | 0.39 | 0.19 | 0.77 | 0.89 | 0.32 | 0.37 | | | 0.66 |
| I.R. Sapo. Rate | % | | 96.8 | 95.2 | 95.6 | | | | | | | |

A process of the invention provided for the preparing of a grease, for example a base grease, using an apparatus of the invention comprising an extruder. The feed component, for example HCO or HCOFA, in the feeder was replaced with a Li 100% soap concentrate made with HCOFA (Average sample disclosed herein in Table 4: Li soap concentrate with HCOFA) that was made during the production of Li soap concentrate as described herein in Example 1.

Four hours of testing were conducted and the temperature profile is shown in Table 7.

TABLE 7

| | Barrel | | | | | | |
|---|---|---|---|---|---|---|---|
| | 1 | 2 | 3 | 4 | 5 | 6 | 7 |
| Profile (° C.) | (1) | 70 | 95 | 130 | 150 | 170 | 190 |
| Barrel | 8 | 9 | 10 | 11 | 12 | 13 | 14 |
| Profile (° C.) | 205 | 195 | 185 | 170 | 130 | 100 | 70 |

Note:
(1) no heating/cooling

The temperatures in Table 7 were the barrel temperatures and were estimated to be approximately 5° C. to 10° C. higher than the product temperatures.

The base grease formulation is disclosed in Table 8.

TABLE 8

| HCOFA | wt % | 9.6 |
|---|---|---|
| LiOH, H₂O | wt % | 1.4 |
| Base oil | wt % | 89.0 |
| Theoretical alkalinity | wt % LiOH | 0.05 |
| Flow rate | kg/h | 14.0 |

The extruder temperature profile disclosed in Table 7 and Screw Configuration 1 disclosed in Table 1 provided a base grease that appeared to be good for National Lubricating Grease Institute (NLGI) (USA) two (2) consistency grade based on a visual check.

From Example 1, several observations may be made. The invention may provide for the manufacture of Li, LiCa, and LiCx soap concentrates utilizing an extruder up to a soap concentration of 100% without a base oil feed (i.e., no feeding or adding of base oil) and with almost complete saponification (measured by FTIR). The invention may provide an advantage regarding handling as the "mother" feed is dry and does not tend to agglomerate due to the presence of oil and such advantage may still be provided with 10% to 15% by weight of oil. The invention may provide for the manufacture of Li, LiCa, and LiCx soap concentrates without water addition. The invention may provide an advantage(s) in terms of unit throughput, energy balance, and a wider operating processing envelope. The invention may provide for the manufacture of a base grease from a 100% soap concentrate comprising the use of an extruder. The invention comprising an extruder may be configured in order to manufacture base greases on specification from the preformed soap concentrates. An advantage of the invention may be achieving generally complete saponification with no water, or with less water than is normally used, and in a higher soap concentration that may provide for high plant throughput and reduced energy requirements.

EXAMPLE 2

An example process of the invention was conducted using a 34-mm twin-screw co-rotating extruder from Coperion Werner and Pfleiderer, Stuttgart, Germany, having model number ZSK34MV, to prepare lithium complex soap concentrates and lithium soap concentrates. Table 9 discloses ranges of compounds for the lithium complex soap concentrates and lithium soap concentrates that were prepared. The "dispersing agents" referred to herein in Example 2 were a blend of two commercially available metal detergents with each metal detergent being present in an amount of 50 weight percent of the blend. The first metal detergent comprised 50 weight percent overbased calcium alkyl salicylate in mineral oil from Infineum, Abingdon, United Kingdom. The second metal detergent comprised 54 weight percent calcium carbonate tall-oil fatty acids complex in hydrocarbon solvent from Rhodia, Paris, France.

TABLE 9

| Compound | Lithium complex soap (wt %) | Lithium soap (wt %) |
| --- | --- | --- |
| HCOFA (hydrogenated castor oil fatty acid) | 56.7-57.9 | — |
| HCO (hydrogenated castor oil) | — | 86.5-88.2 |
| LiOH, H$_2$O (lithium hydroxide monohydrate) | 13.6-14.5 | 12.0-13.3 |
| Boric acid | 8.7-9.0 | — |
| Dispersing agents | 19.4-19.8 | — |
| Total | 100.0 | 100.0 |

Characteristics of the extruder are disclosed in Table 10.

TABLE 10

| | |
| --- | --- |
| Screw length: | 2268 mm |
| Barrel length: | 126 mm |
| Number of barrels: | 18 |
| Barrel heating: | Electrical |
| Barrel cooling: | Water |

In general, solid ingredients (for example, hydrogenated castor oil fatty acid (HCOFA), hydrogenated castor oil (HCO), lithium hydroxide, and boric acid) were fed with gravimetric feeders through a feed hopper entering the extruder in barrel 1. Water was injected in barrel 2 or barrel 3 or a combination thereof via a peristaltic pump obtained from POMPES AB, Maurepas, France. For lithium complex soap concentrate, the dispersing agents were injected in barrel 3 using a gear pump (Cipex model, Maag Pump Systems Textron A.G., Zurich, Switzerland).

An example extruder layout for preparing a lithium complex soap concentrate is disclosed in FIG. 4.
The extruder layout for preparing LiCx soap concentrate generally comprised:
Barrel 1: Solid ingredients feeding (also referred to as a first feeding zone)
Barrel 2: Injection of water (also referred to as a water injecting zone)
Barrel 3: Injection of the dispersing agents (also referred to as a second feeding zone)
Barrels 4 to 5: First reacting zone
Barrel 6: First venting zone
Barrels 7 to 9: Continued reacting zone
Barrel 10: Second venting zone
Barrels 11 to 18: Cooling zone.
Barrels 1 to 18 may be referred to, for example, in FIG. 4 as barrels 301-318, respectively.
Procedures to Start the Test Runs:
LiCx soap concentrate: Generally, a small flow of base oil was needed to prevent solids from plugging up in the feed throat. The extruder was started with a flow of base oil (3 kg/h), then the dispersing agents were injected. When the dispersing agents were entering the extruder, the feeding of the solid ingredients was started. The base oil flow rate was then gradually decreased and finally stopped.
Li soap concentrate: The extruder was started with a flow of base oil (3 kg/h). The ingredients were then injected without water addition. The oil feed rate was progressively decreased to zero. Water was started after stabilization of the process.
To check that a complete reaction was achieved, the free alkali content was measured and the conversion rate of the saponification was determined by infra-red spectrometry (based on the measurement of the soap CO peak at 1580 cm$^{-1}$, of the CO ester peak at 1733 cm$^{-1}$ for greases made with HCO, and of the CO acid peak for greases made with HCOFA). Residual moisture was measured on some samples using the Dean Stark method (ASTM D95). Saponification was determined by Fourier Transform Infra Red (FTIR). Alkalinity was determined as weight percent free LiOH utilizing British Institute of Petroleum Standard IP 37. IP 37 was strictly applied for the lithium greases and was slightly modified for the lithium complex greases by adding 5 grams of glycerol to the other reagents in the first step of IP 37.
Test runs 1 and 2 covered the production of lithium complex soap concentrate. A summary of the process parameters for the lithium complex soap concentrate trials is provided in Table 11. Test runs 1 and 2 for lithium complex soap concentrate utilized Screw Configuration 2. The details of Screw Configuration 2 are disclosed in Table 12. In Table 12, the length and running total are in millimeters (mm). Screw Configuration 2 included two reacting zones. The properties of the soap manufactured in test run 1 are disclosed in Table 13. "Torque, %" refers to the percentage of the maximum torque of the extruder.

TABLE 11

| LiCx soap concentrate - Summary of process parameters | | |
| --- | --- | --- |
| | Test run no. | |
| | 1 | 2 |
| Flow rates, kg/h | | |
| HCOFA | 14.4 | 14.3 |
| LiOH, H2O | 3.4 | 3.6 |

TABLE 11-continued

LiCx soap concentrate - Summary of process parameters

| | Test run no. 1 | Test run no. 2 |
|---|---|---|
| H3BO3 | 2.3 | 2.3 |
| Dispersing agents | 4.9 | 4.9 |
| Total throughput, kg/h | 25.0 | 25.1 |
| Water:Solid ratio | 0.96:1 | 0.90:1 |
| Process conditions | | |
| Screw speed, rpm | 400 | 400 |
| Torque, % | 32 | 30 |
| Temperature profile, ° C. | | |
| Barrel 1 | 50 | 50 |
| Barrel 2 | 50 | 50 |
| Barrel 3 | 50 | 50 |
| Barrel 4 | 125 | 125 |
| Barrel 5 | 190 | 190 |
| Barrel 6 | 200 | 200 |
| Barrel 7 | 200 | 200 |
| Barrel 8 | 220 | 220 |
| Barrel 9 | 220 | 220 |
| Barrel 10 | 220 | 220 |
| Barrel 11 | 200 | 200 |
| Barrel 12 | 175 | 175 |
| Barrel 13 | 150 | 150 |
| Barrel 14 | 100 | 100 |
| Barrel 15 | 75 | 75 |
| Barrel 16 | 50 | 50 |
| Barrel 17 | 50 | 50 |
| Barrel 18 | 50 | 50 |

TABLE 12

Screw Configuration 2 (LiCx soap concentrate)

| Pos. | Element | Pitch | Length | Running Total | Barrel | Barrel Pos. |
|---|---|---|---|---|---|---|
| 1 | 28/14 | 28 | 14 | 14 | BBL1 | |
| 2 | 42/42 | 42 | 42 | 56 | | Feed |
| 3 | 42/42 | 42 | 42 | 98 | | |
| 4 | 42/42 | 42 | 42 | 140 | BBL2 | |
| 5 | 42/42 | 42 | 42 | 182 | | |
| 6 | 42/42 | 42 | 42 | 224 | | |
| 7 | 42/42 | 42 | 42 | 266 | BBL3 | |
| 8 | 42/42 | 42 | 42 | 308 | | |
| 9 | 42/42 | 42 | 42 | 350 | | |
| 10 | 42/42 | 42 | 42 | 392 | BBL4 | |
| 11 | 42/42 | 42 | 42 | 434 | | |
| 12 | 28/28 | 28 | 28 | 462 | | |
| 13 | KB 45/5/28 | | 28 | 490 | | |
| 14 | KB 45/5/28 | | 28 | 518 | BBL5 | |
| 15 | KB 45/5/14 | | 14 | 532 | | |
| 16 | KB 45/5/14 | | 14 | 546 | | |
| 17 | KB 45/5/14 Li | | 14 | 560 | | |
| 18 | 42/42 | 42 | 42 | 602 | | |
| 19 | 42/42 | 42 | 42 | 644 | BBL6 | |
| 20 | 42/42 | 42 | 42 | 686 | | VENT |
| 21 | 42/42 | 42 | 42 | 728 | | |
| 22 | 42/42 | 42 | 42 | 770 | BBL7 | |
| 23 | 42/42 | 42 | 42 | 812 | | |
| 24 | 42/42 | 42 | 42 | 854 | | |
| 25 | 28/28 | 28 | 28 | 882 | | |
| 26 | 28/28 | 28 | 28 | 910 | BBL8 | |
| 27 | 28/28 | 28 | 28 | 938 | | |
| 28 | 28/28 | 28 | 28 | 966 | | |
| 29 | spacer | | 1 | 967 | | |
| 30 | ZME 6.5/13 | | 13 | 980 | | |
| 31 | ZME 6.5/13 | | 13 | 993 | | |
| 32 | spacer | | 1 | 994 | | |
| 33 | KB 45/5/14 | | 14 | 1008 | | |
| 34 | KB 45/5/14 | | 14 | 1022 | BBL9 | |
| 35 | KB 45/5/14 Li | | 14 | 1036 | | |
| 36 | KB 45/5/14 Li | | 14 | 1050 | | |
| 37 | 28/28 | 28 | 28 | 1078 | | |
| 38 | 28/28 | 28 | 28 | 1106 | | |
| 39 | KB 45/5/28 | | 28 | 1134 | | |
| 40 | 42/21 | 42 | 21 | 1155 | BBL10 | |
| 41 | 42/21 | 42 | 21 | 1176 | | |
| 42 | 42/21 | 42 | 21 | 1197 | | |
| 43 | 42/21 | 42 | 21 | 1218 | | VENT |
| 44 | 42/21 | 42 | 21 | 1239 | | |
| 45 | 42/21 | 42 | 21 | 1260 | | |
| 46 | 42/21 | 42 | 21 | 1281 | BBL11 | |
| 47 | 42/21 | 42 | 21 | 1302 | | |
| 48 | 42/21 | 42 | 21 | 1323 | | |
| 49 | 42/21 | 42 | 21 | 1344 | | |
| 50 | 42/21 | 42 | 21 | 1365 | | |
| 51 | 42/21 | 42 | 21 | 1386 | | |
| 52 | 28/28 | 28 | 28 | 1414 | BBL12 | |
| 53 | 28/28 | 28 | 28 | 1442 | | |
| 54 | 28/28 | 28 | 28 | 1470 | | |
| 55 | 28/28 | 28 | 28 | 1498 | | |
| 56 | KB 45/5/28 | | 28 | 1526 | BBL13 | |
| 57 | KB 45/5/28 | | 28 | 1554 | | |
| 58 | 28/28 | 28 | 28 | 1582 | | |
| 59 | 28/14 | 28 | 14 | 1596 | | |
| 60 | KB 45/5/28 | | 28 | 1624 | | |
| 61 | KB 45/5/28 | | 28 | 1652 | BBL14 | |
| 62 | KB 45/5/14 | | 14 | 1666 | | |
| 63 | 28/28 | 28 | 28 | 1694 | | |
| 64 | 28/14 | 28 | 14 | 1708 | | |
| 65 | KB 45/5/28 | | 28 | 1736 | | |
| 66 | KB 45/5/28 | | 28 | 1764 | | |
| 67 | KB 45/5/14 Li | | 14 | 1778 | BBL15 | |
| 68 | 28/28 | 28 | 28 | 1806 | | |
| 69 | 28/14 | 28 | 14 | 1820 | | |
| 70 | KB 45/5/28 | | 28 | 1848 | | |
| 71 | KB 45/5/28 | | 28 | 1876 | | |
| 72 | KB 45/5/14 Li | | 14 | 1890 | | |
| 73 | 28/14 | 28 | 14 | 1904 | BBL16 | |
| 74 | 28/28 | 28 | 28 | 1932 | | |
| 75 | KB 45/5/28 | | 28 | 1960 | | |
| 76 | KB 45/5/28 | | 28 | 1988 | | |
| 77 | KB 45/5/14 Li | | 14 | 2002 | | |
| 78 | 28/28 | 28 | 28 | 2030 | BBL17 | |
| 79 | 28/14 | 28 | 14 | 2044 | | |
| 80 | KB 45/5/28 | | 28 | 2072 | | |
| 81 | KB 45/5/28 | | 28 | 2100 | | |
| 82 | KB 45/5/14 Li | | 14 | 2114 | | |
| 83 | 28/28 | 28 | 28 | 2142 | | |
| 84 | 28/28 | 28 | 28 | 2170 | BBL18 | |
| 85 | 28/28 | 28 | 28 | 2198 | | |
| 86 | 28/28 | 28 | 28 | 2226 | | |
| 87 | 28/28 | 28 | 28 | 2254 | | |
| 88 | 28/14 | 28 | 14 | 2268 | | |

TABLE 13

Properties of the LiCx soap concentrate samples from test runs 1 and 2

| | Test run no. 1 | Test run no. 2-1 | Test run no. 2-2 |
|---|---|---|---|
| Sample no. | 36 | 37 | 38 |
| Feed rate, kg/h | 25 | 25 | 25 LiOH feed rate decreased by 5% |

TABLE 13-continued

Properties of the LiCx soap concentrate samples from test runs 1 and 2

| | Test run no. | | |
|---|---|---|---|
| | 1 | 2-1 | 2-2 |
| Screw speed, rpm | 400 | 400 | 400 |
| Torque, % | 32 | 30 | 30 |
| Water:Solid ratio | 0.96:1 | 0.90:1 | 0.90:1 |
| Saponification rate, % (FTIR) | | 96 | nm |
| Alkalinity (wt % free LiOH) | 1.22 | 1.16 to 1.70 | nm |
| Water content, wt % | nm | 1.95-2.00 | nm | nm: not measured

It was discovered from test run 1 that making a lithium complex soap concentrate may require some additional hardware to help prevent discharge of soap concentrate through the vent ports. It was discovered that the discharge through the vent port may be controlled by using a side-feeder or a vent stuffer to push the product back to the extruder while allowing steam to be vented.

Test run 2 (2-1 and 2-2): Process conditions utilized for test run 1 (Sample 36) were maintained and two pails of lithium complex soap concentrate were produced. Manual stuffing into the two vents was necessary to prevent soap concentrate from discharging through the vents and to transport the product through the extruder. Following a kind of cycle, some moisture was visible at the extruder discharge. A general extruder layout used for test run 2 (2-1 and 2-2) is schematically disclosed in FIG. 4. The temperature profile for test run 2 (2-1 and 2-2) is disclosed in Table 11.

The soap concentrate at the discharge was composed of brownish pieces that were slightly sticky when still warm. The soap concentrate was slightly wet (2 weight percent water). The soap concentrate was not fully homogeneous. Variations in alkalinity were measured from one sample to another.

Side-feeder trial: It was discovered that the use of a side-feeder may help counter the discharge of soap concentrate through the vent ports and may be effective to increase the efficiency of transporting the soap concentrate through an extruder. A side-feeder comprising a twin-screw co-rotating extruder was obtained from Coperion Werner and Pfleiderer Company, Stuttgart, Germany, having model number ZSB40. The first vent section in barrel 6 was replaced by a combi (side-feed) barrel to which the side-feeder was connected.

Tests were conducted with the final run conditions (test run 2-1) and the side-feeder screw speed was set at 210 rpm. Steam was partially evacuated through the side-feeder. Some hard soap concentrate discharged as a pile through the second vent port so manual stuffing was utilized. The natural steam extraction through the vent ports may not have been sufficient and it was discovered that the process may have needed a light vacuum extraction to ease water flashing. The use of one or more side-feeders may be utilized for commercial scale-up.

Lithium Soap Concentrate:

Screw Configuration 3 was utilized to prepare lithium soap concentrate. An example extruder layout for preparing a lithium soap concentrate is disclosed in FIG. 5. The extruder layout for preparing Li soap concentrate generally comprised:

Barrel 1: Solid ingredients feeding (also referred to as a first feeding zone)

Barrels 2 to 3: Injection of water (also referred to as a water injecting zone)
Barrels 4 to 7: First reacting zone
Barrel 8: First venting zone
Barrels 9 to 11: Continued reacting zone
Barrel 12: Second venting zone
Barrels 13 to 18: Cooling zone.

Barrels 1 to 18 may be referred to, for example, in FIG. 5 as barrels 401-418, respectively. The details of Screw Configuration 3 are disclosed in Table 14. In Table 14, the length and running total are in millimeters (mm).

A summary of the process parameters for each test run is disclosed in Table 15.

TABLE 14

Screw Configuration 3
(Li soap concentrate)

| Pos. | Element | Pitch | Length | Running Total | Barrel | Barrel Pos. |
|---|---|---|---|---|---|---|
| 1 | 28/14 | 28 | 14 | 14 | BBL1 | |
| 2 | 42/42 | 42 | 42 | 56 | | Feed |
| 3 | 42/42 | 42 | 42 | 98 | | |
| 4 | 42/42 | 42 | 42 | 140 | BBL2 | |
| 5 | 42/42 | 42 | 42 | 182 | | Liquids |
| 6 | 42/42 | 42 | 42 | 224 | | |
| 7 | 42/42 | 42 | 42 | 266 | BBL3 | |
| 8 | 42/42 | 42 | 42 | 308 | | |
| 9 | 28/28 | 28 | 28 | 336 | | |
| 10 | KB 45/5/28 | | 28 | 364 | | |
| 11 | KB 45/5/14 | | 14 | 378 | | |
| 12 | KB 45/5/14 | | 14 | 392 | BBL4 | |
| 13 | KB 45/5/14 Li | | 14 | 406 | | |
| 14 | 28/28 | 28 | 28 | 434 | | |
| 15 | KB 45/5/28 | | 28 | 462 | | |
| 16 | KB 45/5/14 | | 14 | 476 | | |
| 17 | KB 45/5/14 Li | | 14 | 490 | | |
| 18 | KB 45/5/14 Li | | 14 | 504 | | |
| 19 | 42/42 | 42 | 42 | 546 | BBL5 | |
| 20 | 42/42 | 42 | 42 | 588 | | |
| 21 | 42/42 | 42 | 42 | 630 | | |
| 22 | 28/28 | 28 | 28 | 658 | BBL6 | |
| 23 | 28/28 | 28 | 28 | 686 | | |
| 24 | 28/28 | 28 | 28 | 714 | | |
| 25 | 28/28 | 28 | 28 | 742 | | |
| 26 | 28/28 | 28 | 28 | 770 | BBL7 | |
| 27 | KB 45/5/28 | | 28 | 798 | | |
| 28 | KB 45/5/28 | | 28 | 826 | | |
| 29 | Spacer | | 1 | 827 | | |
| 30 | ZME 6.5/13 | | 13 | 840 | | |
| 31 | ZME 6.5/13 | | 13 | 853 | | |
| 32 | Spacer | | 1 | 854 | | |
| 33 | KB 45/5/14 Li | | 14 | 868 | | |
| 34 | 28/14 Li | | 14 | 882 | | |
| 35 | 42/42 | 42 | 42 | 924 | BBL8 | |
| 36 | 42/42 | 42 | 42 | 966 | | VENT |
| 37 | 42/42 | 42 | 42 | 1008 | | |
| 38 | 42/21 | 42 | 21 | 1029 | BBL9 | |
| 39 | 42/21 | 42 | 21 | 1050 | | |
| 40 | 28/28 | 28 | 28 | 1078 | | |
| 41 | 28/28 | 28 | 28 | 1106 | | |
| 42 | 28/28 | 28 | 28 | 1134 | | |
| 43 | 28/28 | 28 | 28 | 1162 | BBL10 | |
| 44 | KB 45/5/28 | | 28 | 1190 | | |
| 45 | KB 45/5/28 | | 28 | 1218 | | |
| 46 | Spacer | | 1 | 1219 | | |
| 47 | ZME 6.5/13 | | 13 | 1232 | | |
| 48 | ZME 6.5/13 | | 13 | 1245 | | |
| 49 | Spacer | | 1 | 1246 | | |
| 50 | KB 45/5/14 Li | | 14 | 1260 | | |
| 51 | KB 45/5/14 Li | | 14 | 1274 | BBL11 | |
| 52 | 28/28 | 28 | 28 | 1302 | | |
| 53 | 28/14 | 28 | 14 | 1316 | | |
| 54 | KB 45/5/28 | | 28 | 1344 | | |
| 55 | KB 45/5/28 | | 28 | 1372 | | |
| 56 | 28/14 Li | | 14 | 1386 | | |

TABLE 14-continued

Screw Configuration 3
(Li soap concentrate)

| Pos. | Element | Pitch | Length | Running Total | Barrel | Barrel Pos. |
|---|---|---|---|---|---|---|
| 57 | 42/42 | 42 | 42 | 1428 | BBL12 | |
| 58 | 42/42 | 42 | 42 | 1470 | | VENT |
| 59 | 42/42 | 42 | 42 | 1512 | | |
| 60 | 42/42 | 42 | 42 | 1554 | BBL13 | |
| 61 | 42/21 | 42 | 21 | 1575 | | |
| 62 | 42/21 | 42 | 21 | 1596 | | |
| 63 | 42/21 | 42 | 21 | 1617 | | |
| 64 | 42/21 | 42 | 21 | 1638 | | |
| 65 | 42/21 | 42 | 21 | 1659 | BBL14 | |
| 66 | 42/21 | 42 | 21 | 1680 | | |
| 67 | 28/28 | 28 | 28 | 1708 | | |
| 68 | KB 45/5/28 | | 28 | 1736 | | |
| 69 | KB 45/5/28 | | 28 | 1764 | | |
| 70 | KB 45/5/14 Li | | 14 | 1778 | BBL15 | |
| 71 | 28/28 | 28 | 28 | 1806 | | |
| 72 | 28/14 | 28 | 14 | 1820 | | |
| 73 | KB 45/5/28 | | 28 | 1848 | | |
| 74 | KB 45/5/28 | | 28 | 1876 | | |
| 75 | KB 45/5/14 Li | | 14 | 1890 | | |
| 76 | 28/28 | | 28 | 1918 | BBL16 | |
| 77 | 28/14 | 28 | 14 | 1932 | | |
| 78 | KB 45/5/28 | | 28 | 1960 | | |
| 79 | KB 45/5/28 | | 28 | 1988 | | |
| 80 | KB 45/5/14 Li | | 14 | 2002 | | |
| 81 | 28/28 | 28 | 28 | 2030 | BBL17 | |
| 82 | 28/28 | 28 | 28 | 2058 | | |
| 83 | KB 45/5/28 | | 28 | 2086 | | |
| 84 | KB 45/5/14 | | 14 | 2100 | | |
| 85 | KB 45/5/14 | | 14 | 2114 | | |
| 86 | KB 45/5/14 Li | | 14 | 2128 | | |
| 87 | 42/21 | 42 | 21 | 2149 | BBL18 | |
| 88 | 42/21 | 42 | 21 | 2170 | | |
| 89 | 42/21 | 42 | 21 | 2191 | | |
| 90 | 42/21 | 42 | 21 | 2212 | | |
| 91 | 28/28 | 28 | 28 | 2240 | | |
| 92 | 28/28 | 28 | 28 | 2268 | | |

TABLE 15

Li Soap Concentrate - Summary of Process Parameters

| | Test run nos. | | | | | | | | | |
|---|---|---|---|---|---|---|---|---|---|---|
| | 3-1 | 3-2 | 3-3 | 3-4 | 3-5 | 3-6 | 3-7 | 4 | 5-1 | 5-2 |
| Flow rates, kg/h | | | | | | | | | | |
| HCO | 21.9 | 21.9 | 21.8 | 21.8 | 21.8 | 39.4 | 39.3 | 26.2 | 26.2 | 26.2 |
| LiOH | 3.1 | 3.1 | 3.1 | 3.0 | 3.1 | 5.6 | 5.6 | 3.8 | 3.8 | 4.0 |
| Total | 25.0 | 25.0 | 24.9 | 24.8 | 24.9 | 45.0 | 44.9 | 30.0 | 30.0 | 30.2 |
| Water:Solid ratio | 0:1 | 0.42:1 | 0.61:1 | 0.61:1 | 1:1 | 0:1 | 0.27:1 | 0.5:1 | 0:1 | 0:1 |
| Process conditions | | | | | | | | | | |
| Screw speed, rpm | 400 | 400 | 400 | 400 | 500 | 550 | 600 | 400 | 400 | 400 |
| Torque, % | 20 | 18 | 18 | 18 | 17 | 18 | 18 | 17 | | |
| Temperature profile, °C. | | | | | | | | | | |
| Barrel 1 | 50 | 50 | 50 | 50 | 50 | 50 | 50 | 50 | 50 | 50 |
| Barrel 2 | 70 | 70 | 70 | 70 | 70 | 70 | 70 | 70 | 70 | 70 |
| Barrel 3 | 80 | 80 | 80 | 80 | 80 | 80 | 80 | 80 | 80 | 80 |
| Barrel 4 | 95 | 95 | 95 | 95 | 95 | 95 | 95 | 95 | 95 | 95 |
| Barrel 5 | 180 | 180 | 180 | 180 | 180 | 190 | 190 | 190 | 180 | 180 |
| Barrel 6 | 200 | 200 | 200 | 200 | 210 | 220 | 220 | 210 | 200 | 200 |
| Barrel 7 | 230 | 230 | 230 | 230 | 240 | 240 | 240 | 230 | 220 | 220 |
| Barrel 8 | 230 | 230 | 230 | 230 | 240 | 240 | 240 | 235 | 220 | 220 |
| Barrel 9 | 230 | 230 | 230 | 230 | 230 | 230 | 230 | 230 | 220 | 220 |
| Barrel 10 | 210 | 210 | 210 | 210 | 210 | 210 | 210 | 210 | 210 | 210 |
| Barrel 11 | 200 | 200 | 200 | 200 | 200 | 200 | 200 | 200 | 200 | 200 |
| Barrel 12 | 190 | 190 | 190 | 190 | 190 | 190 | 190 | 190 | 190 | 190 |
| Barrel 13 | 170 | 170 | 170 | 170 | 170 | 170 | 170 | 170 | 160 | 160 |
| Barrel 14 | 130 | 130 | 130 | 130 | 130 | 130 | 130 | 130 | 120 | 120 |
| Barrel 15 | 110 | 110 | 110 | 110 | 110 | 110 | 110 | 110 | 90 | 90 |
| Barrel 16 | 75 | 75 | 75 | 75 | 75 | 75 | 75 | 75 | 70 | 70 |
| Barrel 17 | 50 | 50 | 50 | 50 | 50 | 50 | 50 | 50 | 50 | 50 |
| Barrel 18 | 50 | 50 | 50 | 50 | 50 | 50 | 50 | 50 | 50 | 50 |

Test runs 3-1, 3-2, 3-3, 3-4, 3-5, 3-6, and 3-7 utilized Screw Configuration 3 disclosed herein in Example 2. The minimum melt temperature required to avoid overflow through the vent port was 185° C. It was observed that as the throughput increased, the resulting Li soap concentrate pieces were larger.

TABLE 16

Properties of Li soap concentrate samples from test runs 3-1 to 3-7

| | Test run no. | | | | | | |
|---|---|---|---|---|---|---|---|
| | 3-1 | 3-2 | 3-3 | 3-4 | 3-5 | 3-6 | 3-7 |
| Sample no. | 39 | 40 | 41 | 42 | 43 | 44 | 45 |
| Total throughput (kg/h) | 25 | 25 | 25 | 25 | 25 | 45 | 45 |
| Screw speed, rpm | 400 | 400 | 400 | 400 | 500 | 550 | 600 |
| Water:Solid ratio | 0:1 | 0.4:1 | 0.6:1 | 0.6:1 | 1:1 | 0:1 | 0.3:1 |
| Comments | | | | LiOH decreased by 5% | | | |
| Alkalinity (wt % free LiOH) | 0.64 | 0.85 | 0.85 | 0.48 | 0.77 | 0.76 | 0.69 |
| IR spectrum Saponification rate, % | 91.0 | 93.6 | 91.0 | 91.0 | 93.4 | 93.2 | 89.0 |

Test runs 4, 5-1, and 5-2—Screw Configuration 3: Test runs 4 and 5 were for the production of larger amounts of Li soap concentrate at a total throughput of 30 kg/h, a screw speed of 400 rpm and two different water-to-solid ratios: Test run 4: Water-to-solid ratio of 0.5:1 and Test runs 5-1 and 5-2: No water added.

The barrel temperature profiles are shown in Table 15 for test run 4 (water addition), 5-1 (without water addition), and 5-2 (without water addition). The properties of the Li soap concentrates produced from test runs 4, 5-1, and 5-2 are disclosed in Table 17.

TABLE 17

Properties of Li soap concentrate samples from test runs 4 and 5

| | Test run no. | | |
|---|---|---|---|
| | 4 | 5-1 | 5-2 |
| Sample no. | 46 | 47 | 48 |
| Total throughput, kg/h | 30 | 30 | 30.2 |
| Screw speed, rpm | 400 | 400 | 400 |
| Water:Solid ratio | 0.5:1 | 0:1 | 0:1 |
| Comments | | | LiOH +5% |
| Alkalinity, wt % free LiOH | 0.72 0.67 0.66 | 0.53 | 0.84 |
| IR spectrum Saponification rate, % | 92.3 | 96.3 | 89 |
| Water content, % | 2 | 1 | — |

Reconstitution:

Reconstitution was conducted with the LiCx and Li soap concentrates produced as described herein in Example 2.

LiCx Finished Grease:
Modes of Reconstitution:

The reconstitution was made from one LiCx soap concentrate sample 37. (See Table 13 disclosed herein in Example 2.) Reconstitution to provide a finished grease was conducted in two different types of kettles: an open kettle and a closed Pretzsch kettle.

Reconstitution in open kettle: A lithium complex finished grease was manufactured using an open kettle. The following mode of reconstitution was used:

Step 1: AC 600 base oil (a commercially available base oil, obtainable from member companies of the Shell Group) (45 to 60 weight percent of the total base oil amount in the finished grease) and soap concentrate sample 37 (20 weight percent of the finished grease, i.e., 10.5 weight percent HCOFA in the finished grease) were added to the kettle.

Step 2: Heated up to a top temperature of 215° C. at atmospheric pressure and maintained the temperature for 20 minutes.

Step 3: Started recirculating the blend after 5 minutes at a top temperature of 200° C. and a pressure of 6.9 bar.

Step 4: The remaining dilution oil (40 to 55 weight percent of the total base oil amount in the finished grease) was slowly added by gravity flow for 20 minutes (i.e., a flow rate of 140 grams/minute). When oil addition was complete, recirculation was continued to homogenize (at a pressure of 6.9 bar shear).

Step 5: Pumped out at 120° C. to 150° C. using the recirculation pump. A grease was removed from the kettle using a sampling point on the recirculation line. The sampling valve was opened and the return line was closed to remove the sample. The product was removed from the kettle in 5 minutes.

Step 6: Additives were incorporated utilizing a Hobart mixer (capacity: 3 liters; heating mantle: volts: 115; watts: 550). All blend components were individually added to the kettle. After completing additive addition, the Hobart was heated to 75° C. and the additives were mixed for 30 minutes. After completion, the finished product was removed from the Hobart.

Step 7: Milling with an APV Gaulin mill (APV Rannie and Gaulin Homogenizers, Albertslund, Denmark) at a pressure of 207 bar was then conducted. The APV Gaulin mill was a small, laboratory model with a maximum capacity of 1 kilogram. The product was fed into the APV Gaulin mill using a piston with a pressure of 6.9 bar. The head pressure of the APV Gaulin mill was set to 207 bar for the product.

The reconstitution was conducted with dried LiCx soap pieces to help minimize foaming during the dispersion phase of the soap. A small quantity of soap was found on the agitator. Table 18 discloses some basic properties of the LiCx base grease produced as described herein (referred to as Grease 1) compared with those of a LiCx base grease sample from a commercial grease plant.

TABLE 18

Basic properties of the LiCx base grease compared with typical values

| Properties | Grease 1 | Base grease from a commercial grease plant |
|---|---|---|
| FTIR | Clear at 1710 cm$^{-1}$ | Unreacted fat visible at 1710 cm$^{-1}$ |
| Alkalinity, wt % free LiOH | 0.10 | 0.13 |
| 60-stroke penetration, dmm | 260 | 250 |
| Dropping point, °C. | 278 | 232 |

The Grease 1 was blended with an additive package as described herein (i.e., Steps 6 and 7). Table 19 discloses properties of the finished grease.

TABLE 19

Properties of the finished grease made from the soap sample no. 37

| Properties | Grease 2 |
|---|---|
| 60-stroke penetration, dmm | 276 |
| 100,000-stroke penetration, dmm | 345 |
| Difference | 69 |
| Dropping point, °C. | 270 |
| 4-ball wear test (ASTM D-2266), mm | 0.37 |
| High-temperature life (ASTM D-3527, 160° C.), hours | 100 |

TABLE 19-continued

Properties of the finished grease made from the soap sample no. 37

| Properties | Grease 2 |
|---|---|
| Corrosion preventive properties (ASTM D-5969, 5% synthetic sea water) | Fail |
| Corrosion preventive properties (ASTM D-1743) | Pass |

Reconstitution in Pretzch Kettle:
Finished LiCx Grease:
The following mode of reconstitution was used:
Step 1: HVI650 Solvex (one trial with HVI650 Hycat) (commercially available base oils obtainable from member companies of the Shell Group) (50 weight percent of the total base oil amount in the finished grease) and LiCx soap concentrate (sample 37) were added to the kettle. The soap pieces were used as produced, in other words, without drying or crushing.
Step 2: Heated up to the top temperature at atmospheric pressure (example top temperature is disclosed in Table 20) under stirring (100 rpm).
Step 3: Cooling phase down to 165° C. (1.2 to 1.4° C./min) under stiffing (200 rpm).
Step 4: Dilution oil was added at 165° C. (approximately 40 weight percent of the base oil in the final product, added with a pump).
Step 5: Cooling phase (1 to 1.3° C./min).
Step 6: Additives were incorporated at 95° C. (same mode of introduction as for the dilution oil). The additives were introduced into the Pretzch kettle and mixed with the kettle stirrer.
Step 7: Milling with ALM homogeniser from ALM, France (ALM200-1 pass) (the ALM homogeniser was a colloidal homogeniser).

The vents were kept open to help provide for venting or flashing of moisture that was present in the soap concentrate. Different top temperatures were tested: 235° C., 242° C., and 252° C. Increasing the top temperature to 252° C. provided for the preparing of a finished grease with a soap concentrate content of 8 weight percent in the National Lubricating Grease Institute (NLGI) (USA) two (2) grade. An example temperature profile is disclosed in Table 20.

TABLE 20

| Manufacture duration, hour | | | | | | | | | | | | | | |
|---|---|---|---|---|---|---|---|---|---|---|---|---|---|---|
| | 0 | 10 | 20 | 30 | 40 | 52 | 60 | 70 | 80 | 82 | 92 | 102 | 112 | 116 |
| Temp, °C. | 43 | 80 | 123 | 159 | 201 | 229 | 235 | 242 | 250 | 252 | 237 | 219 | 204 | 200 |

| Manufacture duration, hour | | | | | | | | | | | | | | |
|---|---|---|---|---|---|---|---|---|---|---|---|---|---|---|
| | 120 | 124 | 126 | 128 | 130 | 132 | 134 | 136 | 138 | 140 | 142 | 144 | 146 | 148 |
| Temp, °C. | 195 | 191 | 188 | 186 | 183 | 180 | 178 | 176 | 174 | 173 | 170 | 167 | 164 | 163 |

| Manufacture duration, hour | | | | | |
|---|---|---|---|---|---|
| | 150 | 160 | 170 | 180 | 185 |
| Temp, °C. | 159 | 117 | 98 | 84 | 76 |

Evaluation of the finished LiCx grease properties: Grease properties were measured on the two finished LiCx greases made with an equivalent of 8 weight percent HCOFA and, respectively, with HVI650 Solvex and HVI650 Hycat (see results in Table 21, Greases no. 3 and 4).

The soap pieces were used as produced and the soap pieces appeared to be difficult to disperse in the base oil. As disclosed herein in Example 3, trials conducted with a ground soap concentrate in a powder form provided for a decrease of the top temperature for the reconstitution. It was discovered that the use of high top temperatures may be related to the coarse shape of the soap concentrate pieces and that ground soap concentrate may be a good alternative.

Information regarding the reconstitution in a Pretzch kettle to provide for a finished lithium complex grease are disclosed in Table 21.

Step 5: Cooling phase (1 to 1.3° C./min)
Step 6: Additives were incorporated at 95° C. (same mode of introduction as for the dilution oil). Additives were introduced into the Pretzch kettle and mixed with the kettle stirrer.
Step 7: Milling with ALM homogeniser from ALM, France (ALM180-1 pass) (the ALM homogeniser was a colloidal homogeniser).

The two oils were added separately since it was discovered that dispersing the soap concentrate in a blend of HVI160B and HVI650 Solvex produced a very soft, almost liquid, grease. It was discovered that if the soap was first dispersed in HVI160B, a grease of improved quality was made.

Information regarding the reconstitution in a Pretzch kettle to provide for a finished lithium grease are disclosed in Table 22. Temperature profiles for Greases 5 and 6 from Table 22 are disclosed in Table 23.

TABLE 21

Properties of LiCx grease samples re-constituted from preformed LiCx soap concentrate

|  |  |  |  | Grease no. | |
| --- | --- | --- | --- | --- | --- |
|  | Method | Units | Typical grease | 3 | 4 |
| Finished grease |  |  |  |  |  |
| LiCx soap |  | wt % |  | 14.0 | 14.1 |
| Base oil** |  | wt % |  | 72.5 | 72.3 |
| Additives package |  | wt % |  | 13.5 | 13.6 |
| Top Temperature |  | ° C. |  | 252 | 252 |
| Homogenisation type |  |  |  | ALM 200 | ALM 200 |
| Alkalinity base grease | IP 37 | wt % LiOH |  | 0.18 | 0.21 |
| I.R. Saponification rate |  | % |  | 98.5 | 98.2 |
| Penetration Unworked at 25° C. | ISO 2137 | dmm | 275 | 261 | 271 |
| Worked at 25° C. (60 strokes) | ISO 2137 | dmm | 274 | 269 | 283 |
| Difference unworked and worked |  | dmm | −1 | 8 | 12 |
| After 100,000 strokes | ISO 2137 | dmm | 297 | 292 | 304 |
| Difference to original penetration at 25° C. |  | dmm | 23 | 23 | 21 |
| Dropping point | ISO 2176 | ° C. | 276 | 286.6 | 280.6 |
| Oil separation (18 hrs at 40° C.) | IP 121 | wt % | 0.9 | 0.26 | 0.6 |
| Oil separation (7 days at 40° C.) | IP 121 | wt % | 3.3 | 1.18 | 2.03 |
| Roll stability (18 hrs at 65° C.) | ASTM D1831 | dmm | 23 | +30 (299) | +24 (307) |
| EP 4-ball weld load | ASTM D2596 | kg | 310 | 355 | 315 |
| EP 4-ball wear scar (40 kg; 1 hr; 75° C.; 1200 rpm) | ASTM D2266 | mm | 0.38 | 0.46 | 0.46 |
| EP 4-ball (1 min.; 300 kg) | ASTM D2596 |  | pass | pass | pass |

**HVI650 Solvex for Grease no. 3 and HVI650 Hycat for Grease no. 4

Finished Lithium Grease:
A lithium finished grease was reconstituted and was prepared in the National Lubricating Grease Institute (NLGI) (USA) two (2) grade with 8.5 weight percent HCO.
Mode of Reconstitution:
The reconstitution was made in a Pretzsch kettle (used unpressurized). The reconstitution was made from two different Li soap concentrate samples disclosed herein in Example 2 in Table 17: Sample 46 (Water-to-solid ratio: 0.5:1) and Sample 47 (no water added for the saponification reaction).
The following mode of reconstitution was used:
Step 1: HVI160B (a commercially available base oil obtainable from member companies of the Shell Group) (50 weight percent of the total amount of base oil in the finished grease) and soap concentrate (amounts disclosed in Table 22) were added to the kettle.
Step 2: Heated up to a top temperature (200° C.) under stirring (100 rpm).
Step 3: Cooling phase down to 165° C. (1.0 to 1.2° C./min) under stirring (200 rpm).
Step 4: Dilution oil (HVI650 Solvex, commercially available from member companies of the Shell Group) was added at 165° C. (approximately 40 weight percent of the final product, added with a pump).

Properties of Greases 5 and 6 are disclosed in Table 24.

TABLE 22

Properties of finished lithium grease samples reconstituted from preformed Li soap concentrate

|  |  | Grease no. | |
| --- | --- | --- | --- |
|  |  | 5 | 6 |
| Concentrate sample no. |  | 47 | 46 |
| Water injection during saponification | Yes/No | No | Yes |
| Finished grease |  |  |  |
| Soap | wt % | 9.8 | 9.8 |
| Base oil | wt % | 83.5 | 83.6 |
| Additives package | wt % | 6.7 | 6.6 |
| Total | wt % | 100.0 | 100.0 |
| Top temperature | ° C. | 200 | 200 |
| Dilution temperature | ° C. | 165 | 165 |
| Slow cooling rate | ° C./min | 0.98 | 1.14 |
| Base oil used for dispersion of soap |  | HVI160B | HVI160B |

TABLE 23

Grease no. 5

| Duration, minutes | | | | | | | | | | | | | | | | | |
|---|---|---|---|---|---|---|---|---|---|---|---|---|---|---|---|---|---|
| | 0 | 10 | 20 | 30 | 40 | 50 | 64 | 70 | 76 | 78 | 80 | 82 | 84 | 86 | 88 | 90 | 92 |
| Temp, °C. | 32 | 69 | 109 | 140 | 160 | 170 | 184 | 194 | 201 | 202 | 201 | 198 | 196 | 193 | 191 | 190 | 188 |

| Duration, minutes | | | | | | | | | | | | | | | | |
|---|---|---|---|---|---|---|---|---|---|---|---|---|---|---|---|---|
| | 94 | 96 | 98 | 100 | 102 | 104 | 106 | 108 | 110 | 112 | 114 | 116 | 118 | 127 | 142 | 156 |
| Temp, °C. | 186 | 184 | 182 | 181 | 180 | 178 | 176 | 174 | 171 | 170 | 168 | 166 | 163 | 128 | 98 | 58 |

Grease no. 6

| Duration, minutes | | | | | | | | | | | | | | | | |
|---|---|---|---|---|---|---|---|---|---|---|---|---|---|---|---|---|
| | 0 | 12 | 28 | 43 | 48 | 56 | 58 | 60 | 62 | 64 | 66 | 68 | 70 | 72 | 74 | 76 |
| Temp, °C. | 26 | 79 | 139 | 185 | 194 | 200 | 199 | 198 | 194 | 190 | 188 | 185 | 182 | 180 | 179 | 177 |

| Duration, minutes | | | | | | | | | |
|---|---|---|---|---|---|---|---|---|---|
| | 78 | 80 | 82 | 84 | 86 | 88 | 91 | 98 | 110 | 129 |
| Temp, °C. | 176 | 174 | 172 | 170 | 168 | 166 | 163 | 130 | 98 | 53 |

TABLE 24

Evaluation of reconstituted finished lithium grease

| Tests | Method | Units | Grease 5 | Grease 6 | Typical Grease |
|---|---|---|---|---|---|
| BATCH CONTROL | | | | | |
| Appearance | visual | | Homogeneous | Homogeneous | |
| Color | visual | | Shiny Brown | Shiny Brown | |
| Worked pen. at 25° C. | ASTM D217 | dmm | 273 | 276 | 275 |
| Delta pen. worked/unworked | ASTM D217 | dmm | +8 [265] | +20 [256] | 0 |
| Oil separation (18 hrs at 40° C.) | IP 121 | wt % | 1.28 | 1.00 | 1.2 |
| Dropping point | IP 396 | °C. | 195/190 | 193/192 | 191 |
| FTIR - Saponification rate | | | 99.3% | 99.3% | |
| Roll stability (18 hrs at 65° C.) | ASTM D1831 | dmm | +64 [337] | +7 [283] | +74 |
| EP 4-ball weld load | ASTM D2596 | kg | 270 | 280 | 315 |
| Alkalinity (base grease) | IP 37 | wt % LiOH | 0.06 | 0.05 | 0.04 |
| ANNUAL CONTROL | | | | | |
| Storage test (3 months) delta pen | ASTM D217 | dmm | 0 [273] | +5 [281] | +8 (283) |
| Oxidation stability (100° C.; 100 h) | ASTM D942 | kpa | 48.3/41.4 | 41.4/31.0 | 21 |
| EP 4-ball wear scar (40 kg; 1 h; 75° C.; 1200 rpm) | IP 239 | mm | 0.71 | 0.70 | 0.69 |
| Roll stability (100 hrs at 100° C.) | ASTM D1831 | dmm | +136 [409] | +89 [365] | +150 |
| Emcor rust test (distilled water) | IP 220 | Rating | 0/0 | 0/0 | 0/0 |
| Emcor rust test (salt water) | IP 220 | Rating | 3/4 | 4/4 | 3/3 |
| Oil separation (7 days at 40° C.) | IP 121 | wt % | 4.79 | 3.93 | 4.8 |
| Copper corrosion | IP 130 | Rating | 1a | 1a | 1a |
| Delta pen. worked/100,000 strokes | ASTM D217 | dmm | +9 [282] | +4 [280] | 30 |
| INITIAL PRODUCT APPROVAL | | | | | |
| Rust Test | ASTM D1743 | Rating | Pass | Pass | Pass |

EXAMPLE 3

An example process of the invention was conducted using a 62-mm twin-screw co-rotating extruder from Coperion Werner and Pfleiderer, Stuttgart, Germany, having model number ZSK62, to prepare lithium complex soap concentrates and lithium soap concentrates. Table 25 discloses ranges of compounds for the lithium complex soap concentrates and lithium soap concentrates that were prepared. The "dispersing agents" referred to herein in Example 3 were a blend of two commercially available metal detergents with each metal detergent being present in an amount of 50 weight percent of the blend. The first metal detergent comprised 50 weight percent overbased calcium alkyl salicylate in mineral oil from Infineum, Abingdon, United Kingdom. The second metal detergent comprised 54 weight percent calcium carbonate tall-oil fatty acids complex in hydrocarbon solvent from Rhodia, Paris, France.

TABLE 25

| Compound | Lithium complex soap (wt %) | Lithium soap (wt %) |
|---|---|---|
| HCOFA (hydrogenated castor oil fatty acid) | 56.8-59.7 | — |
| HCO (hydrogenated castor oil) | — | 86.6-88.4 |
| LiOH, $H_2O$ (lithium hydroxide monohydrate) | 12.7-15.1 | 12.4-12.6 |
| Boric acid | 8.4-9.1 | — |
| Dispersing agents | 18.0-19.5 | — |
| Total | 100.0 | 100.0 |

Extruder Layout:

An example of a similar extruder layout is disclosed herein in FIG. 6. Solid ingredients (for example, HCOFA, HCO, lithium hydroxide monohydrate, and boric acid) were fed with Brabender Technologie KG, Duisburg, Germany, gravimetric feeders through a funnel entering the extruder in barrel 1 (for example, referred to as barrel 501 in FIG. 6). Water was injected via a plate between the first and second barrels (injection point was at the top of the plate) using a triplex pump while the flushing oil AC600 (a commercially available oil obtainable from member companies of the Shell Group) and the dispersing agents used in the manufacture of LiCx grease were injected using a gear pump (a valve was utilized to switch from the oil to the dispersing agents).

Screw Configuration:

Screw Configuration 3, disclosed in Example 2, Table 14, was used to prepare a lithium soap concentrate. Screw Configuration 2, disclosed in Example 2, Table 12, was used to prepare a lithium complex soap concentrate. Due to the length of each barrel of the 62-mm co-rotating twin-screw extruder (ZSK62), a total of 17 barrels were utilized instead of 18 barrels.

Conditions and Procedure:

The procedures to initiate the test runs are provided in Table 26.

TABLE 26

| LiCx starting procedure | LiCx stopping procedure |
|---|---|
| 1. Start heating When temperature reached: 2. Start extruder 3. Start base oil 4. Start dispersing agents and stop base oil (valves switched) 5. Start feeders (HCOFA, boric acid, LiOH) 6. Start water immediately after feeders | 1. Stop feeders and water 2. Let dispersing agents continue for approximately 5 minutes 3. Start base oil to flush and stop dispersing agents 4. Stop heating 5. Stop base oil 6. Stop extruder |
| Li starting procedure | Li stopping procedure |
| 1. Start heating When temperature reached: 2. Start extruder 3. Start base oil 4. Start feeders (HCO, LiOH) 5. Start water immediately after feeders | 1. Stop feeders and water 2. Start base oil to flush 3. Stop heating 4. Stop base oil 5. Stop extruder |

The characterization of the soap concentrate was the same as disclosed in Example 2 (alkalinity measurement, saponification rate, water content).

Lithium Complex Soap Concentrate: A summary of the trial conditions and process parameters are disclosed herein in Table 27.

Saponification was determined by Fourier Transform Infra Red (FTIR). Alkalinity was determined as weight percent free LiOH utilizing British Institute of Petroleum Standard IP 37. IP 37 was strictly applied for the lithium greases and was slightly modified for the lithium complex greases by adding 5 grams of glycerol to the other reagents in the first step of IP 37.

TABLE 27

Product: LiCx soap concentrate; Screw Configuration 2

| Test run no. | Throughput kg/h | Screw speed rpm | Water:Solid ratio | FTIR (1710 cm−1) | Alkalinity (wt % free LiOH) | Moisture | Comments |
|---|---|---|---|---|---|---|---|
| 6 | 160 | 300 | 0.75:1 | None ATR* | — | — | 97% saponified (LiOH, H2O = 24.4 kg/h) |
| 7 | 160 | 293 | 0.5:1 | None ATR | 0.89 | — | LiOH, H2O = 24.4 kg/h |
| 8 | 160 | 394 | 0.5:1 | None ATR | — | — | LiOH, H2O = 24.4 kg/h |
| 9 | 160 | 200 | 0.5:1 | None ATR | — | — | LiOH, H2O = 24.4 kg/h |
| 10 | 160 | 300 | 1:1 | — | — | — | LiOH, H2O = 24.4 kg/h |
| 11 | 200 | 350 | 1:1 | — | — | — | LiOH, H2O = 30 kg/h (4.5% excess) |
| 12 | 200 | 200 | 1:1 | None ATR | 0.60 | — | LiOH, H2O = 30 kg/h (4.5% excess) |
| 13 | 160 | 300 | 1:1 | — | 0.83 | — | LiOH, H2O = 23.0 kg/h |
| 14 | 160 | 300 | 0.75:1 | — | 0.54 | — | LiOH, H2O = 23.0 kg/h |
| 15 | 160 | 300 | 0.5:1 | — | 0.40 | — | LiOH, H2O = 23.0 kg/h |
| 16 | 160 | 298 | 0.73:1 | — | 0.76 | — | HCOFA down by 0.5% |
| 17 | 160 | 298 | 0.75:1 | — | — | — | HCOFA down by 1% |
| 18 | 160 | 297 | 0.75:1 | — | — | — | Repeat of test 16 |
| 19 | 160 | 295 | 0.75:1 | vsp** | Acidic | — | LiOH, H2O = 23.7 kg/h |
| 20 | 160 | 295 | 0.75:1 | None ATR | 0.5-0.6 | — | LiOH, H2O = 24.4 kg/h |
| 21 | 160 | 295 | 0.75:1 | — | — | — | LiOH, H2O = 23.0 kg/h |
| 22 | 160 | 300 | 0.75:1 | vsp ATR | 1.3 | 17.5 | LiOH, H2O = 23 kg/h; spaghetti-like shape |
| 23 | 160 | 300 | 0.75:1 | vsp ATR | 1.6 | 12.7 | LiOH, H2O = 23 kg/h; spaghetti-like shape |

*ATR refers to Attenuated Total Reflectance; None ATR indicates no visible peak
very small peak Test runs 6 to 10: Conducted with 6 percent excess LiOH at low water-to-solid ratio. The soap concentrate started to appear visually better at a water-to-solid ratio of 0.5 to 1. Since the soap concentrate pieces were large, the screw was dismantled (from run 7**) to add two kneading blocks before the discharge to help reduce the size of the soap concentrate pieces. The soap concentrate pieces were generally soft.

Test runs 11 and 12: A 1:1 water-to-solid ratio was utilized. The LiOH throughput was 4.5 percent excess. The soap concentrate pieces were generally quite large.

Test runs 13 to 21: Conducted at a screw speed of approximately 300 rpm. The water-to-solid ratio was set at 0.75 to 1. The LiOH and HCOFA feed rates were then slightly changed.

Test runs 22 and 23: Conducted with an extruder die that provided for the production of soap concentrate with a spaghetti-like shape (for example, an extrudate, approximately cylindrical with a diameter of approximately 3 mm).

Lithium Complex Soap Concentrate Production Trials 1-16:

A production trial was initiated with the process parameters described herein in Example 3 for test run 20. The water-to-solid ratio was set at 0.75 to 1 and the screw speed was approximately 295 rpm. The LiOH feed rate was in excess by 5.9%. Table 28 discloses the temperature profile used for the lithium complex soap concentrate production trials.

TABLE 28

Temperature profile used for the lithium complex soap concentrate production trials

| | Barrel temperature | | | |
|---|---|---|---|---|
| | Runs 24-29 | | Runs 30-42 | |
| Barrel | Set Point Deg. C. | Actual Deg. C. | Set Point Deg. C. | Actual Deg. C. |
| 1 | cool | cool | cool | cool |
| 2 | 50 | 49 | 50 | 50 |
| 3 | 50 | 48 | 50 | 50 |
| 4 | 50 | 50 | 125 | 125 |
| 5 | 95 | 89 | 190 | 190 |
| 6 | 150 | 150 | 200 | 180 |
| 7 | 200 | 193 | 200 | 176 |
| 8 | 220 | 181 | 220 | 205 |
| 9 | 220 | 227 | 220 | 220 |
| 10 | 234 | 186 | 234 | 192 |
| 11 | 200 | 201 | 200 | 186 |
| 12 | 175 | 174 | 175 | 188 |
| 13 | 150 | 151 | 150 | 161 |
| 14 | 100 | 99 | 100 | 119 |
| 15 | 43 | 73 | 43 | 71 |
| 16 | 25 | 51 | 25 | 49 |
| 17 | 25 | 42 | 25 | 41 |

Changes in alkalinity were observed during the lithium complex soap concentrate production trials (from acidic soap concentrate to an alkalinity of 1.5 wt % free LiOH). Following a kind of cycle, the product quality fluctuated (for example, different color, different texture, more moisture) and then became more consistent. During the kind of cycle, the soap concentrate comprised various shapes, for example, large pieces (generally a flat shape of 1 cm in height, 2 to 3 cm in width, and 5 to 6 cm in length) and smaller pieces (various sizes from 1 mm particles to 2 cm). Analysis conducted on the different samples collected during lithium complex soap concentrate production runs 24 to 42 are disclosed in Table 29.

TABLE 29

LiCx soap concentrate - Production trial

| Run No. | Sample no. | Alkalinity (wt % free LiOH) | | | Water Content (ASTM D95) (%) | I.R. Saponification Rate (%) |
|---|---|---|---|---|---|---|
| 24 | 49 | 0.76 | −1.20 | −1.04 | — | 6 | 86 |
| 25 | 50 | 0.72 | 0.66 | 0.59 | — | 4 | 89 |
| 26 | 51 | Acidic | — | — | — | — | 91 |

TABLE 29-continued

LiCx soap concentrate - Production trial

| Run No. | Sample no. | Alkalinity (wt % free LiOH) | | | Water Content (ASTM D95) (%) | I.R. Saponification Rate (%) |
|---|---|---|---|---|---|---|
| 27 | 52 | 1.17 | — | — | — | — | 92 |
| 28 | 53 | Acidic | — | — | — | — | — |
| 29 | 54 | 0.63 | 0.36 | 0.30 | — | 7 | 91 |
| 30 | 55 | Acidic | — | — | — | 6 | — |
| 31 | 56 | Acidic | — | — | — | — | — |
| 32 | 57 | Acidic | — | — | — | — | — |
| 33 | 58 | 0.89 | — | — | — | — | 96/86** |
| 34 | 59 | Acidic | — | — | — | — | — |
| 35 | 60 | Acidic | — | — | — | — | — |
| 36 | 61 | Acidic | — | — | — | — | — |
| 37 | 62 | 1.09 | 1.44 | 1.24 | 1.09 | — | 95 |
| 38 | 63 | 1.38 | 1.56 | 1.32 | 1.22 | 9/10** | — |
| 39 | 64 | 1.10 | 1.28 | 1.20 | 1.04 | 11 | 93.3 |
| 40 | 65 | 1.40 | 1.48 | 1.31 | 1.17 | 10 | — |
| 41 | 66 | 1.33 | — | — | — | — | — |
| 42 | 67 | — | 0.97 | 0.99 | 0.90 | 9 | — |

**results obtained on two different samples

Lithium Soap Concentrate:

Lithium Soap Concentrate Production Runs:

The lithium soap concentrate production runs were conducted under the following process conditions:

Screw configuration: a slightly modified Screw Configuration 3 disclosed in Example 2. The reverse kneading blocks in the second part of the screw were removed and neutral kneading blocks were added in barrel 2. The total throughput was 40 kg/h. The screw speed was 100 rpm. The water-to-solid ratio was 0.6 to 1.

Four drums of lithium soap concentrate were produced with different alkalinities. The lithium soap concentrate prepared was similar to coarse powder. Table 30 discloses a summary of the analyses of the four drums.

TABLE 30

Lithium Soap Concentrate Production Runs

| Sample No. | Sample Appearance | Alkalinity (wt % free LiOH) | FTIR Saponification Rate (%) | Water content (wt %) |
|---|---|---|---|---|
| 68 | White powder | 9.32 | 100 | 6 |
| 69 | White powder | 0.74 | 95 | 4 |
| 70 | White powder | 0.54 | 85 | 2 |
| 71 | White powder | 10.62 | 100 | 4 |

Reconstitution in Pretzch Kettle:

Reconstitution was conducted with the LiCx and Li soap concentrates produced as described herein in Example 3.

LiCx Finished Grease:

The reconstitution was made from one LiCx soap concentrate sample 62 (see Table 29 disclosed herein in Example 3). Reconstitution to provide a LiCx finished grease was conducted in a closed Pretzch kettle.

The same mode of reconstitution as disclosed in Example 2 was used, with the exception of the top temperature which was lower (180 to 194° C.).

The vents were kept open to help provide for venting or flashing of moisture that was present in the soap concentrate. The temperature profile is disclosed in Table 31.

TABLE 31

| Manufacture duration, minutes | | | | | | | | | | |
|---|---|---|---|---|---|---|---|---|---|---|
| | 0 | 10 | 20 | 30 | 50 | 60 | 62 | 64 | 66 | 68 | 70 |
| Temp., °C. | 25 | 45 | 83 | 125 | 175 | 194 | 193 | 192 | 191 | 189 | 187 |

| Manufacture duration, minutes | | | | | | | | | | |
|---|---|---|---|---|---|---|---|---|---|---|
| | 72 | 74 | 76 | 78 | 80 | 82 | 84 | 86 | 88 | 90 | 92 |
| Temp., °C. | 186 | 183 | 182 | 179 | 177 | 175 | 173 | 173 | 170 | 168 | 166 |

| Manufacture duration, minutes | | | | |
|---|---|---|---|---|
| 94 | 104 | 114 | 124 | 129 |
| Temp., °C. 165 | 130 | 100 | 70 | 61 |

Grease properties of the finished LiCx grease that was prepared (corresponding to a content of 8.9 weight percent HCOFA) are disclosed in Table 32.

TABLE 32

| | Grease 7 |
|---|---|
| Finished grease composition | |
| LiCx Soap (sample 62), wt % | 16.1 |
| Oil, wt % | 71.0 |
| Additives, wt % | 12.9 |
| Top temperature, °C. | 194 |
| Homogenisation type | ALM 200 |
| Cooling rate to 165° C., °C./min | 1.2 |
| Properties | |
| I.R. Saponification rate, % | 98.7 |
| Unworked penetration, dmm | 273 |
| 60-stroke penetration, dmm | 284 |
| 100,000-stroke penetration, dmm | 310 |
| Difference | 26 |
| Dropping point, °C. | 296 |

Lithium Finished Grease:

The reconstitution was made from a Li soap concentrate, sample 69 (see Table 30 disclosed herein in Example 3). Reconstitution to provide a Li finished grease was conducted in a closed Pretzch kettle.

The mode of reconstitution was the same as that disclosed in Example 2, but at a lower top temperature (190° C.).

The vents were kept open to help provide for venting or flashing of moisture that was present in the soap concentrate. The temperature profile is disclosed in Table 33.

TABLE 33

| Manufacture duration, min. | | | | | | | | | | | | |
|---|---|---|---|---|---|---|---|---|---|---|---|---|
| | 0 | 10 | 20 | 30 | 40 | 50 | 60 | 68 | 70 | 72 | 74 | 76 | 78 |
| Temp., °C. | 25 | 34 | 60 | 98 | 135 | 170 | 186 | 190 | 189 | 188 | 186 | 183 | 180 |

| Manufacture duration, min. | | | | | | | | | | |
|---|---|---|---|---|---|---|---|---|---|---|
| | 80 | 82 | 84 | 86 | 88 | 90 | 92 | 100 | 110 | 120 | 130 |
| Temp., °C. | 177 | 174 | 172 | 170 | 168 | 166 | 164 | 133 | 107 | 80 | 61 |

Grease properties of the finished lithium grease that was prepared (8.5 weight percent HCO) are disclosed in Table 34.

TABLE 34

| | Grease 8 |
|---|---|
| Finished grease composition | |
| Li Soap (sample 69), wt % | 9.7 |
| Oil, wt % | 84.1 |
| Additives, wt % | 6.2 |
| Top temperature, °C. | 190 |
| Homogenisation type | ALM 160 |
| Cooling rate to 165° C., °C./min | 1.1 |
| Properties | |
| I.R. Saponification rate, % | 98.7 |
| Unworked penetration, dmm | 253 |
| 60-stroke penetration, dmm | 266 |
| 100,000-stroke penetration, dmm | 270 |
| Difference | 4 |
| Dropping point, °C. | 197.2 |

EXAMPLE 4

Reconstitution Using an Extruder

A reconstitution trial was conducted on the 34 mm (ZSK 34MV) twin-screw co-rotating extruder from Coperion Werner and Pfleiderer, Stuttgart, Germany, described herein in Example 2, utilizing Screw Configuration 4 disclosed in Table 35, to reconstitute a grease from a pre-formed soap concentrate.

A lithium base grease with an equivalent HCO content of 8.75% was reconstituted in HVI 160B base oil (a commercially available oil obtainable from member companies of the Shell Group).

Formulation of the base grease: Li soap concentrate sample 69 (see Table 30 disclosed herein in Example 3): 10 wt % and HVI160B: 90 wt %

Extruder Layout:

The soap concentrate was fed with a K-tron gravimetric feeder (K-TRON International, Inc., Pitman, N.J., USA) through a funnel entering the extruder in barrel 1. Base oil was injected into the extruder at two different points: in barrel 2 (11% of the total oil amount in the base grease) and in barrel 7 (the remaining 89%) using a gear pump.

Screw Configuration 4 and the temperature profile are disclosed in Table 35. The process was conducted with 18 barrels while trying to simulate a 9-barrel extruder so barrels 10 to 18 were generally dormant, in other words, barrels 10 to 18 included only conveying elements under steady temperature conditions.

The screw speed was set to 300 rpm and the total throughput was set to 10 kg/h. The length of the screw was 2268 mm. In Table 35, the length and running total are in millimeters (mm).

Grease properties of lithium base grease that was prepared are disclosed in Table 36.

TABLE 35

| | | Screw Configuration 4 | | | | | |
|---|---|---|---|---|---|---|---|
| Temp., ° C. | Pos. | Element | Pitch | Length | Running Total | Barrel | Barrel Pos. |
| 30 | 1 | 28/14 | 28 | 14 | 14 | BBL1 | |
| | 2 | 42/42 | 42 | 42 | 56 | | Feed |
| | 3 | 42/42 | 42 | 42 | 98 | | |
| 50 | 4 | 42/42 | 42 | 42 | 140 | BBL2 | |
| | 5 | 42/42 | 42 | 42 | 182 | | Oil |
| | 6 | 42/42 | 42 | 42 | 224 | | |
| 130 | 7 | 42/42 | 42 | 42 | 266 | BBL3 | |
| | 8 | 42/42 | 42 | 42 | 308 | | |
| | 9 | 42/42 | 42 | 42 | 350 | | |
| 250 | 10 | 28/28 | 28 | 28 | 378 | BBL4 | |
| | 11 | 42/42 | 42 | 42 | 420 | | |
| | 12 | 42/42 | 42 | 42 | 462 | | |
| | 13 | 28/28 | 28 | 28 | 490 | | |
| 190 | 14 | KB 45/5/28 | | 28 | 518 | BBL5 | |
| | 15 | KB 45/5/28 | | 28 | 546 | | |
| | 16 | KB 45/5/14 | | 14 | 560 | | |
| | 17 | KB 45/5/14 Li | | 14 | 574 | | |
| | 18 | KB 45/5/14 Li | | 14 | 588 | | |
| | 19 | 28/28 | 28 | 28 | 616 | | |
| 175 | 20 | 28/28 | 28 | 28 | 644 | BBL6 | |
| | 21 | 42/42 | 42 | 42 | 686 | | Vent |
| | 22 | 42/42 | 42 | 42 | 728 | | |
| 165 | 23 | 28/28 | 28 | 28 | 756 | BBL7 | |
| | 24 | 28/28 | 28 | 28 | 784 | | Oil |
| | 25 | KB 45/5/28 | | 28 | 812 | | |
| | 26 | KB 45/5/28 | | 28 | 840 | | |
| | 27 | KB 45/5/14 | | 14 | 854 | | |
| | 28 | KB 45/5/14 Li | | 14 | 868 | | |
| 130 | 29 | KB 45/5/14 Li | | 14 | 882 | BBL8 | |
| | 30 | 28/28 | 28 | 28 | 910 | | |
| | 31 | 28/28 | 28 | 28 | 938 | | |
| | 32 | KB 45/5/28 | | 28 | 966 | | |
| | 33 | KB 90/5/28 | | 28 | 994 | | |
| 110 | 34 | KB 45/5/14 | | 14 | 1008 | BBL9 | |
| | 35 | KB 45/5/14 Li | | 14 | 1022 | | |
| | 36 | KB 45/5/14 Li | | 14 | 1036 | | |
| | 37 | 28/28 | 28 | 28 | 1064 | | |
| | 38 | 28/28 | 28 | 28 | 1092 | | |
| | 39 | 28/14 | 28 | 14 | 1106 | | |
| 110 | 40 | 28/28 | 28 | 28 | 1134 | BBL10 | |
| | 41 | 28/28 | 28 | 28 | 1162 | | |
| | 42 | 28/28 | 28 | 28 | 1190 | | |
| | 43 | 28/28 | 28 | 28 | 1218 | | |
| | 44 | 28/28 | 28 | 28 | 1246 | | |
| 110 | 45 | 28/28 | 28 | 28 | 1274 | BBL11 | |
| | 46 | 28/28 | 28 | 28 | 1302 | | |
| | 47 | 28/28 | 28 | 28 | 1330 | | |
| | 48 | 28/28 | 28 | 28 | 1358 | | |
| | 49 | 28/14 | 28 | 14 | 1372 | | |
| 110 | 50 | 28/28 | 28 | 28 | 1400 | BBL12 | |
| | 51 | 28/28 | 28 | 28 | 1428 | | |
| | 52 | 42/21 | 42 | 21 | 1449 | | |
| | 53 | 42/21 | 42 | 21 | 1470 | | |
| 110 | 54 | 42/42 | 42 | 42 | 1512 | BBL13 | |
| | 55 | 42/42 | 42 | 42 | 1554 | | |
| | 56 | 42/42 | 42 | 42 | 1596 | | |
| | 57 | 42/21 | 42 | 21 | 1617 | | |

TABLE 35-continued

Screw Configuration 4

| Temp., °C. | Pos. | Element | Pitch | Length | Running Total | Barrel | Barrel Pos. |
|---|---|---|---|---|---|---|---|
| 110 | 58 | 42/21 | 42 | 21 | 1638 | BBL14 | |
| | 59 | 42/42 | 42 | 42 | 1680 | | |
| | 60 | 42/42 | 42 | 42 | 1722 | | |
| 110 | 61 | 42/42 | 42 | 42 | 1764 | BBL15 | |
| | 62 | 42/42 | 42 | 42 | 1806 | | |
| | 63 | 42/21 | 42 | 21 | 1827 | | |
| | 64 | 42/21 | 42 | 21 | 1848 | | |
| | 65 | 42/21 | 42 | 21 | 1869 | | |
| 110 | 66 | 42/42 | 42 | 42 | 1911 | BBL16 | |
| | 67 | 42/42 | 42 | 42 | 1953 | | |
| | 68 | 42/42 | 42 | 42 | 1995 | | |
| 110 | 69 | 42/21 | 42 | 21 | 2016 | BBL17 | |
| | 70 | 42/21 | 42 | 21 | 2037 | | |
| | 71 | 42/21 | 42 | 21 | 2058 | | |
| | 72 | 42/21 | 42 | 21 | 2079 | | |
| | 73 | 42/21 | 42 | 21 | 2100 | | |
| | 74 | 42/21 | 42 | 21 | 2121 | | |
| 110 | 75 | 42/21 | 42 | 21 | 2142 | BBL18 | |
| | 76 | 28/28 | 28 | 28 | 2170 | | |
| | 77 | 28/14 | 28 | 14 | 2184 | | |
| | 78 | 28/14 | 28 | 14 | 2198 | | |
| | 79 | 28/14 | 28 | 14 | 2212 | | |
| | 80 | 28/28 | 28 | 28 | 2240 | | |
| | 81 | 28/28 | 28 | 28 | 2268 | | |

TABLE 36

| Properties | Grease 9 (Soap concentrate no. 69) |
|---|---|
| Unworked penetration, dmm | 262 |
| 60-stroke penetration, dmm | 270 |
| Difference | 8 |
| Dropping point, °C. | 196 |

What is claimed is:

1. A process for preparing a soap concentrate comprising:
providing an apparatus comprising an extruder and a plurality of zones arranged in series and in fluid communication, wherein the plurality of zones comprise (a) a first feeding zone; (b) a first reacting zone; (c) a first venting zone; and (d) a cooling zone, and wherein the zones are in the order (a), (b), (c), (d);
introducing feed components to the first feeding zone (a);
allowing the feed components to react in the first reacting zone (b);
allowing venting from the first venting zone (c);
allowing output to be cooled within the cooling zone (d); and
thereby obtaining the soap concentrate.

2. A process according to claim 1 wherein the apparatus further comprises a continued reacting zone and a second venting zone and further comprising, after (c) and before (d), (i) allowing continued reacting in the continued reacting zone; and (ii) allowing second venting in the second venting zone.

3. A process according to claim 1 wherein the apparatus further comprises a second feeding zone and further comprising introducing one or more initial additives to the second feeding zone.

4. A process according to claim 1 wherein the apparatus further comprises a water injecting zone and further comprising injecting water in the water injecting zone.

5. A process according to claim 1 wherein the soap concentrate comprises at least one concentrate selected from the group consisting of lithium soap concentrate, lithium complex soap concentrate, lithium-calcium soap concentrate, and calcium complex soap concentrate.

6. A process according to claim 1 further comprising combining the soap concentrate with a base oil to prepare a base grease.

7. A process according to claim 1 wherein the feed components comprise:
hydrogenated castor oil in an amount of 75 weight percent to 95 weight percent, based on the total weight of the soap concentrate; and
at least one selected from the group consisting of lithium hydroxide, lithium hydroxide monohydrate, and a combination thereof in an amount of 8 weight percent to 20 weight percent, based on the total weight of the soap concentrate.

8. A process according to claim 1 wherein the feed components comprise:
hydrogenated castor oil in an amount of 75 weight percent to 95 weight percent, based on the total weight of the soap concentrate; and
at least one selected from the group consisting of lithium hydroxide, lithium hydroxide monohydrate, calcium hydroxide, and a combination thereof in an amount of 8 weight percent to 20 weight percent, based on the total weight of the soap concentrate.

9. A process according to claim 1 wherein the feed components comprise:
hydrogenated castor oil fatty acid in an amount of 75 weight percent to 95 weight percent, based on the total weight of the soap concentrate; and
at least one selected from the group consisting of lithium hydroxide, lithium hydroxide monohydrate, and a combination thereof in an amount of 8 weight percent to 20 weight percent, based on the total weight of the soap concentrate.

10. A process according to claim 1 wherein the feed components comprise:

hydrogenated castor oil fatty acid in an amount of 75 weight percent to 95 weight percent, based on the total weight of the soap concentrate; and at least one selected from the group consisting of lithium hydroxide, lithium hydroxide monohydrate, calcium hydroxide, and a combination thereof in an amount of 8 weight percent to 20 weight percent, based on the total weight of the soap concentrate.

11. A process according to claim 1 wherein the feed components comprise:

hydrogenated castor oil or hydrogenated castor oil fatty acid in an amount of 50 weight percent to 65 weight percent, based on the total weight of the soap concentrate; and at least one selected from the group consisting of lithium hydroxide, lithium hydroxide monohydrate, and a combination thereof in an amount of 10 weight percent to 20 weight percent, based on the total weight of the soap concentrate; and a complexing agent in an amount of 6 weight percent to 12 weight percent, based on the total weight of the soap concentrate.

12. A process according to claim 1 wherein the feed components comprise:

hydrogenated castor oil or hydrogenated castor oil fatty acid in an amount of 50 weight percent to 65 weight percent, based on the total weight of the soap concentrate; and at least one selected from the group consisting of lithium hydroxide, lithium hydroxide monohydrate, calcium hydroxide and a combination thereof in an amount of 10 weight percent to 20 weight percent, based on the total weight of the soap concentrate; and a complexing agent in an amount of 6 weight percent to 12 weight percent, based on the total weight of the soap concentrate.

* * * * *